(12) United States Patent
Kamiya et al.

(10) Patent No.: US 9,663,077 B2
(45) Date of Patent: May 30, 2017

(54) HYDRAULIC-PRESSURE CONTROL DEVICE AND HYDRAULIC BRAKING SYSTEM

(71) Applicants: Yusuke Kamiya, Okazaki (JP); Kiyoyuki Uchida, Konan (JP)

(72) Inventors: Yusuke Kamiya, Okazaki (JP); Kiyoyuki Uchida, Konan (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 257 days.

(21) Appl. No.: 14/382,945

(22) PCT Filed: Feb. 15, 2013

(86) PCT No.: PCT/JP2013/054636
§ 371 (c)(1),
(2) Date: Sep. 4, 2014

(87) PCT Pub. No.: WO2013/136950
PCT Pub. Date: Sep. 19, 2013

(65) Prior Publication Data
US 2015/0021979 A1    Jan. 22, 2015

(30) Foreign Application Priority Data

Mar. 16, 2012    (JP) ................. 2012-060021

(51) Int. Cl.
*B60T 8/44*    (2006.01)
*B60T 8/17*    (2006.01)
(Continued)

(52) U.S. Cl.
CPC ............... *B60T 8/17* (2013.01); *B60T 7/042* (2013.01); *B60T 8/326* (2013.01); *B60T 8/341* (2013.01);
(Continued)

(58) Field of Classification Search
CPC .......... B60T 8/17; B60T 7/042; B60T 13/142; B60T 8/4077; B60T 13/145;
(Continued)

(56) References Cited

U.S. PATENT DOCUMENTS 8,061,786 B2 * 11/2011 Drumm ................. B60T 8/4077
188/358
8,342,615 B2 * 1/2013 Drumm ................. B60T 8/4077
188/152
(Continued)

FOREIGN PATENT DOCUMENTS

EP    1 028 043 A2    8/2000
JP    2005-30453 A    2/2005
(Continued)

OTHER PUBLICATIONS

International Search Report issued on Jul. 2, 2013 in PCT/JP13/054636 filed Feb. 15, 2013.

*Primary Examiner* — Pamela Rodriguez
(74) *Attorney, Agent, or Firm* — Oblon, McClelland, Maier & Neustadt, L.L.P.

(57) ABSTRACT

A hydraulic-pressure control device includes a regulator including a housing, a control piston in the housing, an input chamber at a rear of the piston, and an output chamber in front of the piston; and an input-hydraulic-pressure control device which controls hydraulic pressure in the input chamber to move the piston forward or backward to raise or reduce hydraulic pressure in the output chamber. The input-hydraulic-pressure control device includes a moving-direction control unit which, when a difference obtained by subtracting an actual hydraulic pressure in the output chamber from a target hydraulic pressure in the output chamber is less than a pressurization-side set value, controls the hydraulic pressure in the input chamber to move the piston backward; and when the difference is greater than a reduc- (Continued)

tion-side set value, controls the hydraulic pressure in the input chamber to move the piston forward.

14 Claims, 9 Drawing Sheets

(51) Int. Cl.
    *B60T 8/32*     (2006.01)
    *B60T 8/34*     (2006.01)
    *B60T 8/36*     (2006.01)
    *B60T 8/40*     (2006.01)
    *B60T 13/14*     (2006.01)
    *B60T 13/68*     (2006.01)
    *B60T 7/04*     (2006.01)
    *B60T 13/66*     (2006.01)

(52) U.S. Cl.
    CPC .......... *B60T 8/3655* (2013.01); *B60T 8/4077* (2013.01); *B60T 8/441* (2013.01); *B60T 13/142* (2013.01); *B60T 13/146* (2013.01); *B60T 13/147* (2013.01); *B60T 13/662* (2013.01); *B60T 13/686* (2013.01)

(58) Field of Classification Search
    CPC ...... B60T 13/686; B60T 13/161; B60T 13/58; B60T 13/745; B60T 8/326; B60T 8/341; B60T 8/3655; B60T 8/441; B60T 13/146; B60T 13/147; B60T 13/662
    USPC ..... 303/114.1, 20, 122.04, 122.05, 151, 152, 303/155
See application file for complete search history.

(56) References Cited

U.S. PATENT DOCUMENTS

| | | | |
|---|---|---|---|
| 9,004,617 B2 * | 4/2015 | Ishida | ................. B60T 7/042 303/114.1 |
| 2010/0253135 A1 | 10/2010 | Drumm et al. | |
| 2011/0285199 A1 | 11/2011 | Ishida | |
| 2015/0015059 A1 * | 1/2015 | Kamiya | ................. B60T 7/042 303/6.01 |

FOREIGN PATENT DOCUMENTS

| | | |
|---|---|---|
| JP | 2011 156998 | 8/2011 |
| JP | 2011-240873 A | 12/2011 |
| WO | 2009 065884 | 5/2009 |

* cited by examiner

FIG.3
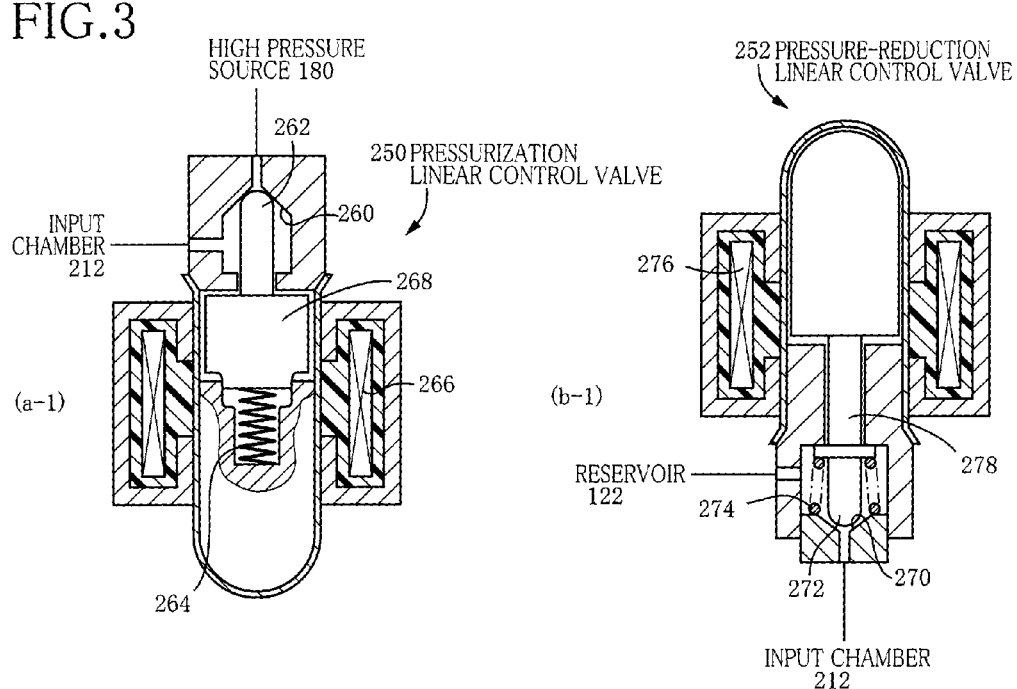
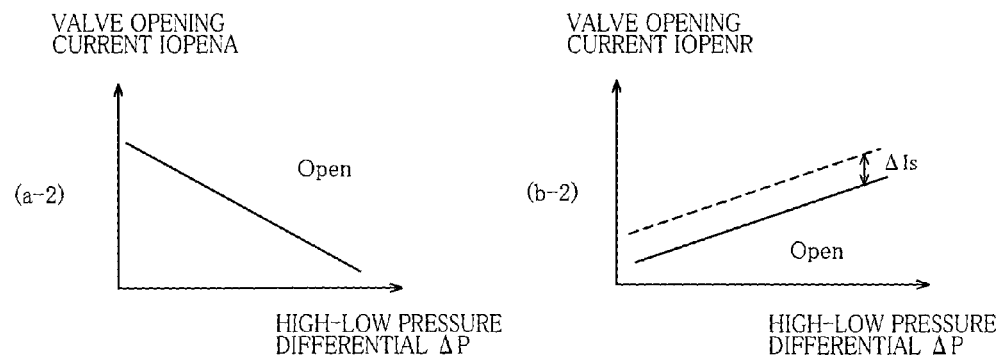
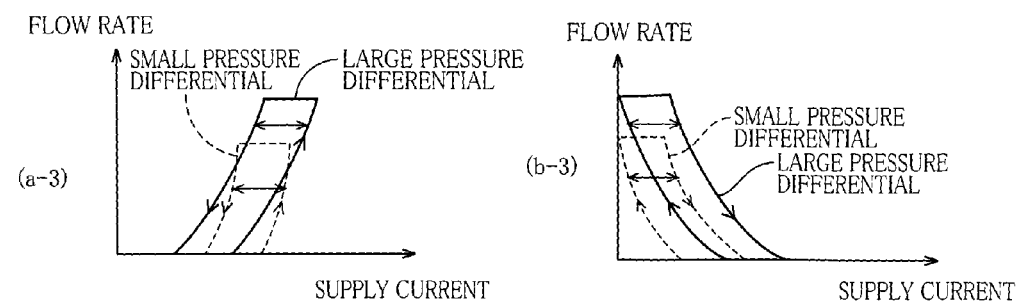

FIG.8

| CONTROL MODE | SUPPLY CURRENT AMOUNT (PRESSURIZATION LINEAR CONTROL VALVE IA, PRESSURE-REDUCTION LINEAR CONTROL VALVE IR) |
|---|---|
| PRESSURE BUILDUP MODE | $IA = IopenA + IFB$<br>$IR = IopenR + \Delta Is$ |
| BUILDUP-HOLDING TRANSITION MODE | $IA = IopenA + IFB - \Delta Isa$<br>$IR = IopenR + \Delta Is$ |
| PRESSURE HOLDING MODE | $IA = IopenA - \Delta Is$<br>$IR = IopenR + \Delta Is$ |
| PRESSURE REDUCTION MODE | $IA = IopenA - \Delta Is$<br>$IR = IopenR - IFB$ |
| REDUCTION-HOLDING TRANSITION MODE | $IA = IopenA - \Delta Is$<br>$IR = IopenR - IFB + \Delta Isr$ |

HYDRAULIC-PRESSURE CONTROL DEVICE AND HYDRAULIC BRAKING SYSTEM

TECHNICAL FIELD

The present invention relates to a hydraulic-pressure control device equipped with a regulator and a hydraulic braking system including the hydraulic-pressure control device.

BACKGROUND ART

Patent document 1 discloses a hydraulic-pressure control device including a pressurization mechanism. This pressurization mechanism includes: (1) a housing; (2) a stepped piston fluid-tightly and slidably fitted in the housing and including a large diameter portion and a small diameter portion; (3) an input chamber provided on a side of the stepped piston nearer to the large diameter portion than to the small diameter portion; (4) an output chamber provided on a side of the stepped piston nearer to the small diameter portion than to the large diameter portion; (5) a high pressure chamber communicating with the output chamber; (6) a high-pressure supply valve provided between the output chamber and the high pressure chamber; and (7) a valve opening member provided on the stepped piston, wherein a master cylinder is coupled to the input chamber, a brake cylinder is coupled to the output chamber, and an accumulator is coupled to the high pressure chamber. When the stepped piston is advanced by hydraulic pressure in the master cylinder, the valve opening member switches the high-pressure supply valve to its open state. Working fluid at high pressure is thereby supplied to the output chamber, so that hydraulic pressure in the output chamber is built up and supplied to the brake cylinder. That is, the hydraulic pressure in the master cylinder is built up and supplied to the brake cylinder, allowing a great braking force to be produced.

PRIOR ART DOCUMENT

Patent Document

Patent Document 1: Japanese Patent Application Publication No. 2011-156998

SUMMARY OF THE INVENTION

Problem to be Solved by the Invention

This invention has been developed to improve control accuracy for hydraulic pressure in an output chamber in a hydraulic-pressure control device including a regulator.

Means for Solving Problem and Effects

The present invention provides a hydraulic-pressure control device comprising:
a regulator comprising: (a) a housing; (b) a control piston fluid-tightly and slidably fitted in the housing; (c) an input chamber provided at a rear of the control piston; and (d) an output chamber provided in front of the control piston; and
an input-hydraulic-pressure control device configured to control hydraulic pressure in the input chamber to control hydraulic pressure in the output chamber,
wherein the input-hydraulic-pressure control device comprises a control unit configured to control the hydraulic pressure in the input chamber with consideration of a sliding resistance caused between the control piston and the housing.

A predetermined relationship is established between the hydraulic pressure in the input chamber and the hydraulic pressure in the output chamber. The hydraulic pressure in the input chamber is controlled based on this relationship to bring the hydraulic pressure in the output chamber closer to a target hydraulic pressure.

Incidentally, in the case where the sliding resistance is caused between the control piston and the housing, when a direction of a force acting on the control piston in its moving direction is changed, a direction of the sliding resistance is changed, which changes a relationship between the hydraulic pressure in the output chamber and the hydraulic pressure in the input chamber. Thus, in a case where no consideration is given to the sliding resistance in the control of the hydraulic pressure in the input chamber, it is difficult to bring the hydraulic pressure in the output chamber closer to the target hydraulic pressure.

In contrast, in the case where consideration is given to the sliding resistance in the control of the hydraulic pressure in the input chamber, the hydraulic pressure in the output chamber can be satisfactorily brought closer to the target hydraulic pressure, thereby improving control accuracy for the hydraulic pressure in the output chamber, when compared with the case where no consideration is given to the sliding resistance.

Forms of the Invention

There will be described by way of examples inventions recognized to be claimable by the present applicant or features of the inventions.

(1) A hydraulic-pressure control device comprising:
a regulator comprising: (a) a housing; (b) a control piston fluid-tightly and slidably fitted in the housing; (c) an input chamber provided at a rear of the control piston; and (d) an output chamber provided in front of the control piston; and
an input-hydraulic-pressure control device configured to control hydraulic pressure in the input chamber to move the control piston forward to raise hydraulic pressure in the output chamber and configured to control the hydraulic pressure in the input chamber to move the control piston backward to reduce the hydraulic pressure in the output chamber,
wherein the input-hydraulic-pressure control device comprises a moving-direction control unit configured to:
when a difference that is a value obtained by subtracting an actual hydraulic pressure in the output chamber from a target hydraulic pressure in the output chamber is less than a pressurization-side set value, control the hydraulic pressure in the input chamber to move the control piston backward; and
when the difference is greater than a reduction-side set value, control the hydraulic pressure in the input chamber to move the control piston forward.

In the hydraulic-pressure control device, the hydraulic pressure in the input chamber (hereinafter may be referred to as "input hydraulic pressure") Pin is controlled to bring the hydraulic pressure in the output chamber (hereinafter may be referred to as "output hydraulic pressure") Pout closer to the target hydraulic pressure, and in general it is considered that one of a pressurization control, a pressure-reduction control, and a holding control is selectively executed based on the difference in the following manner.

When the difference obtained by subtracting the actual hydraulic pressure, namely output hydraulic pressure Pout, from the target hydraulic pressure in the output chamber is greater than the pressurization threshold value, a pressure buildup mode is established in which the input hydraulic pressure Pin is raised. The control piston is advanced to a position within a pressure-buildup region (hereinafter may be simply referred to as "pressure-buildup position", and it is noted that the pressure-buildup position is not limited to a single position and any position within the pressure-buildup region may be the pressure-buildup position), whereby communication between the output chamber and a high pressure source is established, thereby raising the output hydraulic pressure Pout. When the difference is less than the pressure-reduction threshold value, a pressure reduction mode is established in which the input hydraulic pressure Pin is reduced. The control piston is moved backward to a position within a pressure-reduction region (hereinafter may be simply referred to as "pressure-reduction position", and it is noted that the pressure-reduction position is not limited to a single position and any position within the pressure-reduction region may be the pressure-reduction position), whereby communication between the output chamber and a low pressure source is established, thereby reducing the output hydraulic pressure Pout. When the difference is equal to or less than the pressurization threshold value and equal to or greater than the pressure-reduction threshold value, a pressure holding mode is established in which the input hydraulic pressure Pin is held or maintained. The control piston is moved to a holding position between the pressure-buildup position and the pressure-reduction position, whereby the output chamber is disconnected from the high pressure source and the low pressure source.

When consideration is given to a sliding resistance caused between the housing and the control piston, Equation (1) is provided when a forward force is applied to the control piston, for example.

$$\text{Pout} \cdot \text{Aout} = \text{Pin} \cdot \text{Ain} - Fs - F\mu \quad (1)$$

In Equation (1), Aout denotes the area of a pressure receiving surface of the control piston which faces the output chamber, Ain denotes the area of a pressure receiving surface of the control piston which faces the input chamber, $F\mu$ denotes a sliding resistance caused between the control piston and the housing, and Fs denotes, e.g., an urging force of a spring (when two or more springs are provided, Fs denotes the sum of urging forces of the respective springs).

When a backward force is applied to the control piston, Equation (2) is provided.

$$\text{Pout} \cdot \text{Aout} = \text{Pin} \cdot \text{Ain} - Fs + F\mu \quad (2)$$

Equations (1), (2) show that a direction of the sliding resistance $F\mu$ in the case where the forward force is applied to the control piston and the direction of the sliding resistance $F\mu$ in the case where the backward force is applied to the control piston are opposite each other.

For example, Equations (1), (2) show that the output hydraulic pressure is raised by a changing amount ΔPout (2·Fμ/Aout) for a period in which a control mode is switched from the pressure buildup mode to the pressure holding mode (in which the input hydraulic pressure Pin is maintained), a direction of a force acting on the control piston is changed to the backward direction, and the control piston is moved backward and reaches the holding position. In other words, Equations (1), (2) show that the output hydraulic pressure needs to be raised by ΔPout to switch the control mode from the pressure buildup mode to the pressure holding mode and move the control piston to the holding position. Accordingly, when the control mode is switched to the pressure holding mode after the difference becomes less than the pressurization threshold value, the output hydraulic pressure Pout is thereafter raised by the changing amount ΔPout (2·Fμ/Aout), making it difficult for the output hydraulic pressure Pout to be brought closer to the target hydraulic pressure.

To solve this problem, the hydraulic-pressure control device according to present form is configured such that when the difference is less than the pressurization-side set value that is greater than the pressurization threshold value, the input hydraulic pressure Pin is controlled so as to move the control piston backward. As a result, the control piston can be moved backward toward the holding position before the control mode is switched from the pressure buildup mode to the pressure holding mode. Also, when compared with a case where, after the difference is less than the pressurization threshold value, the control mode is switched to the pressure holding mode and the control piston is moved backward, the output hydraulic pressure Pout can be satisfactorily brought closer to the target hydraulic pressure, thereby improving the control accuracy.

Also, as described above, the control for moving the control piston backward is executed before the control mode is switched from the pressure buildup mode to the pressure holding mode. Thus, this control can be referred to as "buildup-holding transition control" ("buildup-holding transition mode").

The explanation above can be applied to a case where the control mode is switched from the pressure reduction mode to the pressure holding mode. The input hydraulic pressure Pin is maintained and the control piston is moved forward from the pressure-reduction position to the holding position, and for this period, the output hydraulic pressure is reduced by the changing amount ΔPout (2·Fμ/Aout). However, where the input hydraulic pressure Pin is controlled so as to move the control piston forward when the difference is greater than the reduction-side set value that is less than the pressure-reduction threshold value, the control mode is switched to the pressure holding mode after the difference becomes greater than the pressure-reduction threshold value. Thus, when compared with the case where the control piston is moved forward, the output hydraulic pressure Pout can be satisfactorily brought closer to the target hydraulic pressure. This control can be referred to as "reduction-holding transition control" ("reduction-holding transition mode").

Thus, in the hydraulic-pressure control device according to the present form, the output hydraulic pressure Pout can be satisfactorily brought closer to the target hydraulic pressure, thereby improving the control accuracy. In a case where a device to be controlled is coupled to the output chamber, it is possible to improve control accuracy for hydraulic pressure in the device to be controlled.

(2) The hydraulic-pressure control device according to the above form (1), wherein each of at least one of the pressurization-side set value and the reduction-side set value is a value that is determined based on hydraulic pressure corresponding to a sliding resistance caused between the control piston and the housing.

(3) The hydraulic-pressure control device according to the above form (1) or (2), wherein each of at least one of the pressurization-side set value and the reduction-side set value is a value that is proportional to hydraulic pressure corresponding to twice a sliding resistance caused between the control piston and the housing.

An absolute value of the pressurization-side set value and an absolute value of the reduction-side set value may or may not be equal to each other, and each absolute value may be a fixed value or a variable value.

Each of the absolute values of the pressurization-side set value and the reduction-side set value may be determined based on the sliding resistance $F\mu$ as described above. For example, each absolute value may be set at hydraulic pressure corresponding to $2\cdot F\mu/A_{out}$, i.e., a value that is proportional to the hydraulic pressure corresponding to twice the sliding resistance.

On the other hand, a magnitude of the sliding resistance $F\mu$ depends on properties of a sealing portion provided between the control piston and the housing, such as a material, a size (i.e., a contact area), and a surface pressure, making it difficult to actually measure the magnitude of the sliding resistance $F\mu$. Even if the actual measurement is possible, great variation makes it difficult to accurately measure the magnitude of the sliding resistance $F\mu$. For these reasons, a value of the sliding resistance $F\mu$ is estimated based on the properties of the sealing portion such as the material, the size, and an average surface pressure, and the magnitude of the sliding resistance $F\mu$ is determined based on the estimated value of the sliding resistance $F\mu$.

(4) The hydraulic-pressure control device according to any one of the above forms (1) through (3), wherein an absolute value of each of at least one of the pressurization-side set value and the reduction-side set value is determined at a value that is greater in a case where at least one of the hydraulic pressure in the output chamber and the hydraulic pressure in the input chamber is high than in a case where the at least one of the hydraulic pressure in the output chamber and the hydraulic pressure in the input chamber is low.

The sliding resistance $F\mu$ is larger in the case where the surface pressure of the sealing portion is high than in the case where the surface pressure of the sealing portion is low, and the surface pressure is higher in the case where the input hydraulic pressure or the output hydraulic pressure is high than in the case where the input hydraulic pressure or the output hydraulic pressure is low. Thus, the absolute value of each of the pressurization-side set value and the reduction-side set value can be set at a value that is greater in the case where at least one of the hydraulic pressure in the output chamber and the hydraulic pressure in the input chamber is high than in the case where the at least one of the hydraulic pressure in the output chamber and the hydraulic pressure in the input chamber is low.

(5) The hydraulic-pressure control device according to any one of the above forms (1) through (4), wherein the input-hydraulic-pressure control device comprises a normal control unit configured to:

raise the hydraulic pressure in the input chamber when the difference is greater than a pressurization threshold value;

reduce the hydraulic pressure in the input chamber when the difference is less than a pressure-reduction threshold value; and hold the hydraulic pressure in the input chamber when the difference is between the pressurization threshold value and the pressure-reduction threshold value, and wherein the pressurization-side set value is a value greater than the pressurization threshold value, and the reduction-side set value is a value less than the pressure-reduction threshold value.

In the pressurization control, the difference usually becomes less than the pressurization-side set value before becoming less than the pressurization threshold value, while in the pressure-reduction control, the difference usually becomes greater than the reduction-side set value before becoming greater than the pressure-reduction threshold value. Thus, the controls are normally executed in the order of the pressurization control, the buildup-holding transition control, and the holding control or in the order of the pressure-reduction control, the reduction-holding transition control, and the holding control.

(6) The hydraulic-pressure control device according to any one of the above forms (1) through (5), wherein the input-hydraulic-pressure control device comprises a buildup-reduction control unit configured to:

when there is a request to raise the hydraulic pressure in the output chamber, control the hydraulic pressure in the input chamber to move the control piston forward to an inside of a pressure-buildup region to establish communication between the output chamber and a high pressure source;

when there is a request to reduce the hydraulic pressure in the output chamber, control the hydraulic pressure in the input chamber to move the control piston backward to an inside of a pressure-reduction region, to establish communication between the output chamber and a low pressure source.

(7) The hydraulic-pressure control device according to any one of the above forms (1) through (6), wherein the regulator further comprises: (e) a high pressure chamber communicable with the output chamber and with a high pressure source; and (f) a high-pressure supply valve provided between the high pressure chamber and the output chamber and configured to establish or interrupt the communication between the output chamber and the high pressure chamber, and wherein the control piston comprises a valve opening member configured to switch a state of the high-pressure supply valve from a closed state to an open state with the forward movement of the control piston.

When an increase in the input hydraulic pressure advances the control piston, the valve opening member changes the high-pressure supply valve from the closed state to the open state. Thus, the communication between the output chamber and the high pressure chamber is established to raise the output hydraulic pressure. A region within which the control piston is located when the output chamber and the high pressure chamber are in communication with each other is the pressure-buildup region. In other words, the output chamber and the high pressure chamber are in communication with each other for a duration in time that the control piston is located within the pressure-buildup region.

The valve opening member is moved with movement of a main body of the control piston and may be provided integrally with or separately from the main body of the control piston.

(8) The hydraulic-pressure control device according to the above form (7), wherein the control piston is a stepped piston comprising a large diameter portion and a small diameter portion, wherein the input chamber is located at a rear of the large diameter portion, and the output chamber is located in front of a step of the large diameter portion and the small diameter portion, and wherein the valve opening member constitutes the small diameter portion.

The control piston is the stepped piston including the large diameter portion and the small diameter portion, and the hydraulic pressure in the input chamber acts on the large diameter portion while the hydraulic pressure in the output chamber acts on the step of the large diameter portion and the small diameter portion. Thus, the output hydraulic pressure Pout is controlled to have a high value with respect to the input hydraulic pressure Pin, and the regulator has a function as a pressurization device.

(9) The hydraulic-pressure control device according to the above form (7) or (8), wherein the high-pressure supply valve comprises: (a) a seat provided in the housing; (b) a body provided capable of being moved to and away from the seat; and (c) a spring configured to urge the body toward the seat, wherein the valve opening member is provided in an orientation in which the valve opening member extends in a direction of the movement of the control piston, and wherein the control piston further comprises a low-pressure-port communication passage that couples an end portion of the valve opening member which is contactable with the body of the high-pressure supply valve, to a low pressure port formed in the housing so as to communicate with a low pressure source.

In a state in which a forward-side end portion of the valve opening member (hereinafter referred to as "forward end portion", and the forward end portion is the end portion contactable with the body of the high-pressure supply valve) is held in contact with the body of the high-pressure supply valve, the output chamber is disconnected from the low pressure port. A position of the control piston at which the output chamber is isolated from the low pressure source (or the low pressure port) and the high pressure source (or the high pressure chamber) is the holding position.

When the backward movement of the control piston moves the forward end portion of the valve opening member off the body, the communication between the output chamber and the low pressure port is established, which lowers the output hydraulic pressure Pout. A region within which the control piston is located when the output chamber and the low pressure port are in communication with each other is the pressure-reduction region.

It is noted that elements such as the high pressure chamber, the high-pressure supply valve, the valve opening member, and the low-pressure-port communication passage can be considered to constitute an output-chamber-communication control valve device.

(10) The hydraulic-pressure control device according to any one of the above forms (1) through (9), wherein the moving-direction control unit comprises a non-increasing-trend control unit configured to:

control the hydraulic pressure in the input chamber to move the control piston backward when the difference is less than the pressurization-side set value and is not on an increasing trend; and control the hydraulic pressure in the input chamber to move the control piston forward when the difference is greater than the reduction-side set value, and an absolute value of the difference is not on the increasing trend.

There is a high possibility that the control mode is switched to the pressure holding mode when the difference is less than the pressurization-side set value or greater than the reduction-side set value and when the absolute value of the difference is on the decrease or generally constant (that is, when the output hydraulic pressure Pout tends to be brought closer to a target hydraulic pressure Poutref or a difference therebetween is generally constant). Thus, in this case, the buildup-holding transition control and the reduction-holding transition control are preferably executed.

On the other hand, there is a low possibility that the control mode is switched to the pressure holding mode when the absolute value of the difference is on the increase (that is, when the actual hydraulic pressure Pout in the output chamber tends to be brought further from the target hydraulic pressure Poutref) even when the difference is less than the pressurization-side set value or greater than the reduction-side set value. Thus, in this case, the buildup-holding transition control and the reduction-holding transition control are not executed. As a result, the output hydraulic pressure Pout can be speedily brought closer to the target hydraulic pressure Poutref, which can improve a response.

(11) The hydraulic-pressure control device according to any one of the above forms (1) through (10), wherein the moving-direction control unit comprises a change-gradient suppressing unit configured to:

when the difference is less than the pressurization-side set value, control the hydraulic pressure in the input chamber to reduce an increase gradient of the hydraulic pressure in the input chamber with respect to an increase gradient of the hydraulic pressure in the output chamber; and when the difference is greater than the reduction-side set value, control the hydraulic pressure in the input chamber to reduce a reduction gradient of the hydraulic pressure in the input chamber with respect to a reduction gradient of the hydraulic pressure in the output chamber.

In the pressurization control, when the difference is less than the pressurization-side set value, the input hydraulic pressure Pin is controlled such that the increase gradient of the input hydraulic pressure Pin is reduced with respect to the increase gradient of the output hydraulic pressure Pout. As a result, the output hydraulic pressure Pout is raised relative to the input hydraulic pressure Pin, whereby a direction of a force applied to the control piston is switched from a forward direction to the backward direction, which moves the control piston backward.

In the pressure-reduction control, when the difference is greater than the reduction-side set value, the input hydraulic pressure Pin is controlled such that the reduction gradient of the input hydraulic pressure Pin is reduced relative to the reduction gradient of the output hydraulic pressure Pout. As a result, the input hydraulic pressure Pin is raised relative to the output hydraulic pressure Pout, whereby the direction of the force applied to the control piston is switched from the backward direction to the forward direction, which moves the control piston forward.

(12) The hydraulic-pressure control device according to any one of the above forms (1) through (11), wherein the moving-direction control unit comprises a change-gradient suppressing unit configured to:

make smaller an increase gradient of the hydraulic pressure in the input chamber with respect to the difference in a case where the difference is less than the pressurization-side set value than in a case where the difference is equal to or greater than the pressurization-side set value; and make smaller a reduction gradient of the hydraulic pressure in the input chamber with respect to the difference in a case where the difference is greater than the reduction-side set value than in a case where the difference is equal to or less than the reduction-side set value.

When the control mode is switched from the pressure buildup mode to the buildup-holding transition mode, the increase gradient of the input hydraulic pressure Pin determined based on the difference is reduced, but the change in the increase gradient of the output hydraulic pressure Pout determined based on the difference is delayed. Thus, the increase gradient of the input hydraulic pressure Pin is reduced with respect to the increase gradient of the output hydraulic pressure Pout, so that the output hydraulic pressure Pout becomes high with respect to the input hydraulic pressure Pin. As a result, the direction of the force applied to the control piston is changed to the backward direction, allowing the control piston to be moved backward.

When the control mode is switched from the pressure reduction mode to the reduction-holding transition mode, the reduction gradient of the input hydraulic pressure Pin is reduced, but the change in the reduction gradient of the output hydraulic pressure Pout is delayed. Thus, the reduction gradient of the input hydraulic pressure Pin is reduced with respect to the reduction gradient of the output hydraulic pressure Pout, so that the input hydraulic pressure Pin becomes high with respect to the output hydraulic pressure Pout. As a result, the forward force is applied to the control piston, allowing the control piston to be moved forward.

(13) The hydraulic-pressure control device according to any one of the above forms (1) through (12), wherein the input-hydraulic-pressure control device comprises: (i) a pressurization control unit configured to raise the hydraulic pressure in the input chamber to raise the hydraulic pressure in the output chamber; and (ii) a pressure-reduction control unit configured to reduce the hydraulic pressure in the input chamber to reduce the hydraulic pressure in the output chamber, wherein the pressurization control unit comprises: (a) a pressurization linear control valve provided between the input chamber and the high pressure source and configured to allow working fluid to flow at a flow rate that is higher in a case where a supply current value for a solenoid of the pressurization linear control valve is large than in a case where the supply current value for the solenoid of the pressurization linear control valve is small; and (b) a first current control unit configured to control a supply current for the pressurization linear control valve and comprising: (b-1) a pressurization current-value determination unit configured, when the difference is equal to or greater than the pressurization-side set value, to determine the supply current value for the pressurization linear control valve based on the difference and a predetermined pressurization rule; and (b-2) a pressurization-holding-transition current-value determination unit configured, when the difference is less than the pressurization-side set value, to determine the supply current value for the pressurization linear control valve as a value that is less than the supply current value determined based on the difference and the pressurization rule, and wherein the pressure-reduction control unit comprises: (c) a pressure-reduction linear control valve provided between the input chamber and the low pressure source and configured to allow the working fluid to flow at a flow rate that is higher in a case where a supply current value for a solenoid of the pressure-reduction linear control valve is small than in a case where the supply current value for the solenoid of the pressure-reduction linear control valve is large; and (d) a second current control unit configured to control a supply current for the pressure-reduction linear control valve and comprising: (d-1) a reduction current-value determination unit configured, when the difference is equal to or less than the reduction-side set value, to determine the supply current value for the pressure-reduction linear control valve based on the difference and a predetermined pressure-reduction rule; and (d-2) a reduction-holding-transition current-value determination unit configured, when the difference is greater than the reduction-side set value, to determine the supply current value for the pressure-reduction linear control valve as a value that is greater than the supply current value determined based on the difference and the pressure-reduction rule.

With the pressure-reduction linear control valve being in the closed state, the pressurization control unit controls the supply current for the pressurization linear control valve to control the input hydraulic pressure Pin. The flow rate of the working fluid into the input chamber is made higher, and thereby the increase gradient of the input hydraulic pressure Pin is made larger in the case where the supply current value for the pressurization linear control valve is large than in the case where the supply current value for the pressurization linear control valve is small. In the buildup-holding transition control, the supply current value for the pressurization linear control valve is reduced. The flow rate of the working fluid into the input chamber is made smaller, and thereby the increase gradient of the input hydraulic pressure Pin is made smaller. However, since the change in the increase gradient of the output hydraulic pressure Pout is delayed, the increase gradient of the output hydraulic pressure Pout becomes larger, whereby the output hydraulic pressure Pout becomes high relative to the input hydraulic pressure Pin. As a result, the direction of the force applied to the control piston is changed to the backward direction, allowing the control piston to be moved backward. It is noted that since Equation (2) is established, a direction of a force related to the input hydraulic pressure Pin acting on the control piston coincides with a direction of the sliding resistance Fμ. Thus, when compared with the case where Equation (1) is established, even when the input hydraulic pressure Pin is controlled so as to have a low value with respect to the output hydraulic pressure Pout, the output hydraulic pressure Pout can be satisfactorily brought closer to the target hydraulic pressure.

With the pressurization linear control valve being in the closed state, the pressure-reduction control unit controls the supply current for the pressure-reduction linear control valve to control the input hydraulic pressure Pin. The flow rate of the working fluid from the input chamber is made higher, and thereby the reduction gradient of the input hydraulic pressure Pin is made larger in the case where the supply current value for the pressure-reduction linear control valve is small than in the case where the supply current value for the pressure-reduction linear control valve is large. In the reduction-holding transition control, the supply current value for the pressure-reduction linear control valve is made larger, and the reduction gradient of the input hydraulic pressure Pin is reduced with respect to the reduction gradient of the output hydraulic pressure Pout. As a result, the input hydraulic pressure Pin becomes high relative to the output hydraulic pressure Pout, and thereby the direction of the force acting on the control piston is changed to the forward direction, allowing the control piston to be moved forward.

(14) The hydraulic-pressure control device according to any one of the above forms (1) through (13), wherein the input-hydraulic-pressure control device comprises:

at least one electromagnetic control valve coupled to the input chamber and each comprising a seat and a body, wherein a degree of opening between the seat and the body is determined as a value related to a supply current value for a solenoid of each of the at least one electromagnetic control valve; and a hysteresis-related-current-value determination unit configured, for each of the at least one electromagnetic control valve, to determine the supply current value therefor with consideration of hysteresis between the supply current value and the degree of opening.

For example, in a case where a trend of the degree of opening in the electromagnetic control valve is switched from an increasing trend to a decreasing trend, when the supply current value for the solenoid is changed by a value equal to greater than a current value that corresponds to a width of the hysteresis, the degree of opening can be speedily reduced.

When the pressure differential is constant, there exists a one-to-one correspondence between the degree of opening and the flow rate. Thus, a relationship between the degree of opening and the supply current value corresponds to a relationship between the flow rate and the supply current value.

(15) The hydraulic-pressure control device according to the above form (14), wherein each of the at least one electromagnetic control valve has a hysteresis characteristic between the supply current value and the degree of opening, wherein the hysteresis characteristic is determined based on a high-low pressure differential in each of the at least one electromagnetic control valve, and wherein the hysteresis-related-current-value determination unit comprises:

a pressure-differential obtaining unit configured to obtain the high-low pressure differential in each of the at least one electromagnetic control valve; and a pressure-differential-hysteresis-based supply-current-value determination unit configured to determine the supply current value for each of the at least one electromagnetic control valve, based on the hysteresis characteristic determined based on the high-low pressure differential obtained by the pressure-differential obtaining unit.

Where the hysteresis characteristic is determined based on the high-low pressure differential in the electromagnetic control valve which is a differential between hydraulic pressure on a high pressure side and hydraulic pressure on a low pressure side, it is preferable that an actual pressure differential is obtained to obtain the hysteresis characteristic based on the obtained pressure differential and then to determine the supply current value based on the hysteresis characteristic.

(16) A hydraulic-pressure control device comprising:

a regulator comprising: (a) a housing; (b) a control piston fluid-tightly and slidably fitted in the housing; (c) an input chamber provided at a rear of the control piston; and (d) an output chamber provided in front of the control piston; and an input-hydraulic-pressure control device configured to control hydraulic pressure in the input chamber to move the control piston forward to raise hydraulic pressure in the output chamber and configured to control the hydraulic pressure in the input chamber to move the control piston backward to reduce the hydraulic pressure in the output chamber, wherein the input-hydraulic-pressure control device comprises an acting-force control unit configured to:

when a difference that is a value obtained by subtracting an actual hydraulic pressure in the output chamber from a target hydraulic pressure in the output chamber is less than a pressurization-side set value, control the hydraulic pressure in the input chamber to apply a backward force to the control piston; and when the difference is greater than a reduction-side set value, control the hydraulic pressure in the input chamber to apply a forward force to the control piston.

When the difference becomes less than the pressurization-side set value, the direction of the force applied to the control piston is switched from the forward direction to the backward direction, while when the difference becomes greater than the reduction-side set value, the direction of the force switched from the backward direction to the forward direction.

The force acting on the control piston is a force for moving the control piston, which force is represented by the sum of vectors of all the forces applied to the control piston. A magnitude of the force acting on the control piston is a magnitude of the sum of the vectors of all the forces, and a direction of the force acting on the control piston is a direction of the sum of the vectors of all the forces.

The hydraulic-pressure control device according to the present form can adopt any of the technical features in the forms (1) through (15).

(17) A hydraulic-pressure control device comprising:

a regulator comprising: (a) a housing; (b) a control piston fluid-tightly and slidably fitted in the housing; (c) an input chamber provided at a rear of the control piston; and (d) an output chamber provided in front of the control piston; and an input-hydraulic-pressure control device configured to control hydraulic pressure in the input chamber to move the control piston to selectively raise or reduce hydraulic pressure in the output chamber, wherein the input-hydraulic-pressure control device comprises a sliding-resistance switching unit configured to control the hydraulic pressure in the input chamber to reverse a direction of a sliding resistance caused between the control piston and the housing, when a difference that is a value obtained by subtracting an actual hydraulic pressure in the output chamber from a target hydraulic pressure in the output chamber is less than a pressurization-side set value, or when the difference is greater than a reduction-side set value.

When the direction of the force applied to the control piston is reversed, the direction of the sliding resistance is also reversed. The direction of the sliding resistance is opposite a direction of the force acting on the control piston.

The hydraulic-pressure control device according to the present form can adopt any of the technical features in the forms (1) through (15)

(18) A hydraulic braking system comprising:

the hydraulic-pressure control device according to any one of the above forms (1) through (17);

a cylinder device comprising: (e) a housing; (f) a pressurizing piston fluid-tightly and slidably fitted in the housing; (g) a rear chamber provided at a rear of the pressurizing piston and coupled to the output chamber; and (h) a front pressure chamber provided in front of the pressurizing piston; and a brake cylinder, coupled to the front pressure chamber, for a hydraulic brake capable of restraining rotation of a wheel of a vehicle.

Hydraulic pressure in the rear chamber advances the pressurizing piston, causing hydraulic pressure to be produced in the front pressure chamber and supplied to the brake cylinder. Thus, hydraulic pressure Pwc in the brake cylinder is determined based on the hydraulic pressure in the rear chamber. Also, the hydraulic pressure in the rear chamber is controlled by control for the output hydraulic pressure Pout, and this output hydraulic pressure Pout is controlled by control for the input hydraulic pressure Pin. Therefore, the hydraulic pressure Pwc in the brake cylinder is controlled by the control for the input hydraulic pressure Pin in the regulator.

The output chamber and the rear chamber may be directly or indirectly coupled to each other. In other words, elements such as electromagnetic control valves and pressurization devices may or may not be provided between the output chamber and the rear chamber.

Where the output chamber and the rear chamber are directly connected to each other, the hydraulic pressure in the output chamber and the hydraulic pressure in the rear chamber are normally equal to each other. Where the output chamber and the rear chamber are indirectly coupled to each other, the hydraulic pressures in these chambers are not always equal to each other, but where these chambers are coupled to each other via an electromagnetic control valve, the hydraulic pressures in these chambers may be equal to each other.

Since control accuracy for the output hydraulic pressure is improved in the hydraulic-pressure control device, control accuracy for the hydraulic pressure in the rear chamber can be improved in the cylinder device, resulting in improvement in control accuracy for the hydraulic pressure in the brake cylinder.

(19) The hydraulic braking system according to the above form (18), wherein the hydraulic-pressure control device comprises a target output-hydraulic-pressure determination unit configured to determine the target hydraulic pressure in the output chamber based on target hydraulic pressure in the brake cylinder.

A target value of the hydraulic pressure in the brake cylinder can be determined, for example, by operating states of the brake operating member such as an operating force and an operating stroke.

(20) A hydraulic-pressure control device comprising:

a regulator comprising: (a) a housing; (b) a control piston fluid-tightly and slidably fitted in the housing; (c) an input chamber provided on one side of the control piston; and (d) an output chamber provided on the other side of the control piston;

an input-hydraulic-pressure control device configured to control hydraulic pressure in the input chamber to move the control piston to selectively raise or reduce hydraulic pressure in the output chamber;

a cylinder device comprising: (e) a housing; (f) a pressurizing piston fluid-tightly and slidably fitted in the housing; (g) a rear chamber provided at a rear of the pressurizing piston and coupled to the output chamber; and (h) a front pressure chamber provided in front of the pressurizing piston; and a brake cylinder, coupled to the front pressure chamber, for a hydraulic brake capable of restraining rotation of a wheel of a vehicle, wherein the input-hydraulic-pressure control device comprises a sliding-resistance-related pressure control unit configured to control the hydraulic pressure in the input chamber with consideration of a sliding resistance caused between the control piston and the housing of the regulator.

The hydraulic braking system according to the present form can adopt any of the technical features in the forms (1) through (19).

When the sliding resistance caused between the control piston and the housing is small, there is small need to consider the sliding resistance. However, when the sliding resistance is not small, the input hydraulic pressure is preferably controlled with consideration of the sliding resistance. This improves the control accuracy for the output hydraulic pressure.

It is noted that, in the hydraulic braking system in the present form, the control of the moving-direction control unit described in the form (1) may not be applied to both of the pressure buildup and reduction of the hydraulic pressure in the output chamber, and the control may be applied to one of the pressure buildup and reduction and may not be applied to either of the pressure buildup and reduction.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIGS. 3($a$-1), ($a$-2), ($a$-3) are views for explaining a pressurization linear control valve of the hydraulic-pressure control device, and FIGS. 3($b$-1), ($b$-2), ($b$-3) are views for explaining a pressure-reduction linear control valve of the hydraulic-pressure control device, wherein FIG. 3($a$-1) is a cross-sectional view of the pressurization linear control valve, FIG. 3($a$-2) is a view representing a relationship between a pressure differential in the pressurization linear control valve and a valve opening current, FIG. 3($a$-3) is a view representing a relationship between a flow quantity in the pressurization linear control valve and a supply current value, FIG. 3($b$-1) is a cross-sectional view of the pressure-reduction linear control valve, FIG. 3($b$-2) is a view representing a relationship between a pressure differential in the pressure-reduction linear control valve and a valve opening current, and FIG. 3($b$-3) is a relationship between a flow quantity in the pressure-reduction linear control valve and a supply current value;

FIG. 8 is a view representing supply current values for the pressurization linear control valve and the pressure-reduction linear control valve in each of control modes;

DETAILED DESCRIPTION OF THE EMBODIMENTS

Figure 1:
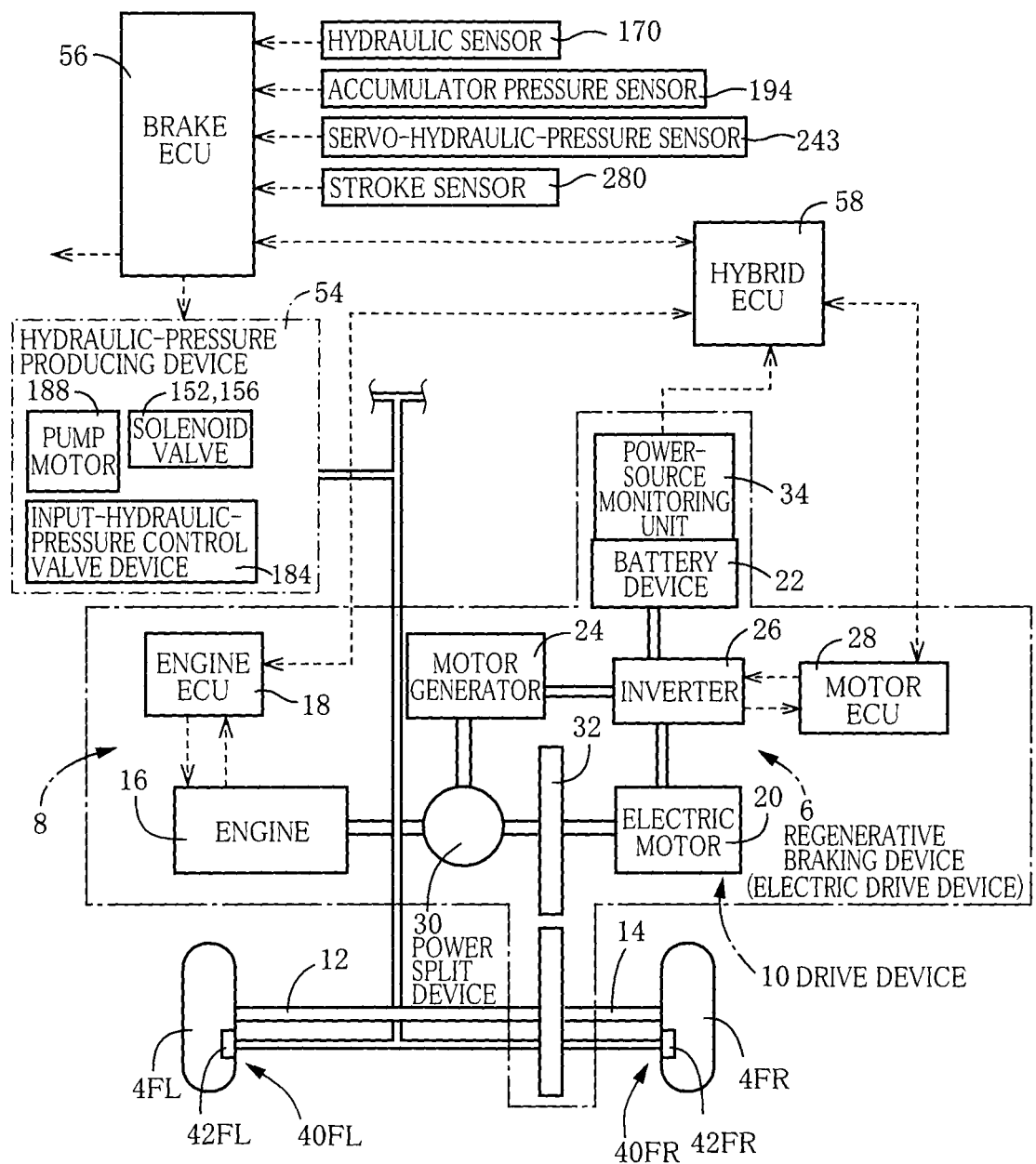
FIG. 1 is a view illustrating the entirety of a vehicle on which is installed a hydraulic braking system according to an embodiment 1 of the present invention, wherein the present hydraulic braking system includes a hydraulic-pressure control device according to the embodiment 1 of the present invention.

Hereinafter, there will be described embodiments of the present invention by reference to the drawings. The present hydraulic braking system includes a hydraulic-pressure control device according to one embodiment of the present invention.

Embodiment 1

<Vehicle>

The present hydraulic braking system is mounted on a hybrid vehicle (including a plug-in hybrid vehicle). In this hybrid vehicle, front right and left wheels 4FR, 4FL as drive wheels are driven by a drive device 10 that includes an electric drive device 6 and an internal-combustion drive device 8. A motive force or a drive force of the drive device 10 is transmitted to front left and right wheels 4FL, FR via drive shafts 12, 14, respectively. The internal-combustion drive device 8 includes an engine 16 and an engine ECU 18 configured to control an operating state of the engine 16. The electric drive device 6 includes a drive motor (hereinafter may be simply referred to as "electric motor") 20, a battery device 22, a motor generator 24, an inverter 26, and a drive motor ECU (hereinafter may be simply referred to as "motor ECU") 28. The engine 16, the electric motor 20, and the motor generator 24 are connected or coupled to a power split device 30. The flow of the force or power is switched by this power split device 30 so that only a motive force of the electric motor 20 is transmitted to an output member 32, or both a motive force of the engine 16 and the motive force of the electric motor 20 are transmitted to the output member 32, or the motive force of the engine 16 is transmitted to both the motor generator 24 and the output member 32, for example. The output member 32 is one component of a decelerator, and the motive force of the drive device 10 is transmitted to the drive shafts 12, 14 via the decelerator and differential gears.

The inverter 26 is controlled by the motor ECU 28 to selectively establish one of at least a driving state and a charging state. The driving state is a state in which the electric motor 20 is rotated by electric energy supplied from the battery device 22, and the charging state is a state in which the electric motor 20 is operated as a generator during regenerative braking to store electric energy into the battery device 22. In the charging state, a regenerative braking force is applied to the front right and left wheels 4FR, FL. In this sense, the electric drive device 6 can be called a regenerative braking device.

The battery device 22 may be equipped with a nickel-metal hydride cell or a lithium ion cell, for example. A power-source monitoring unit 34 obtains information about the charging state of the battery device 22.

Figure 2:
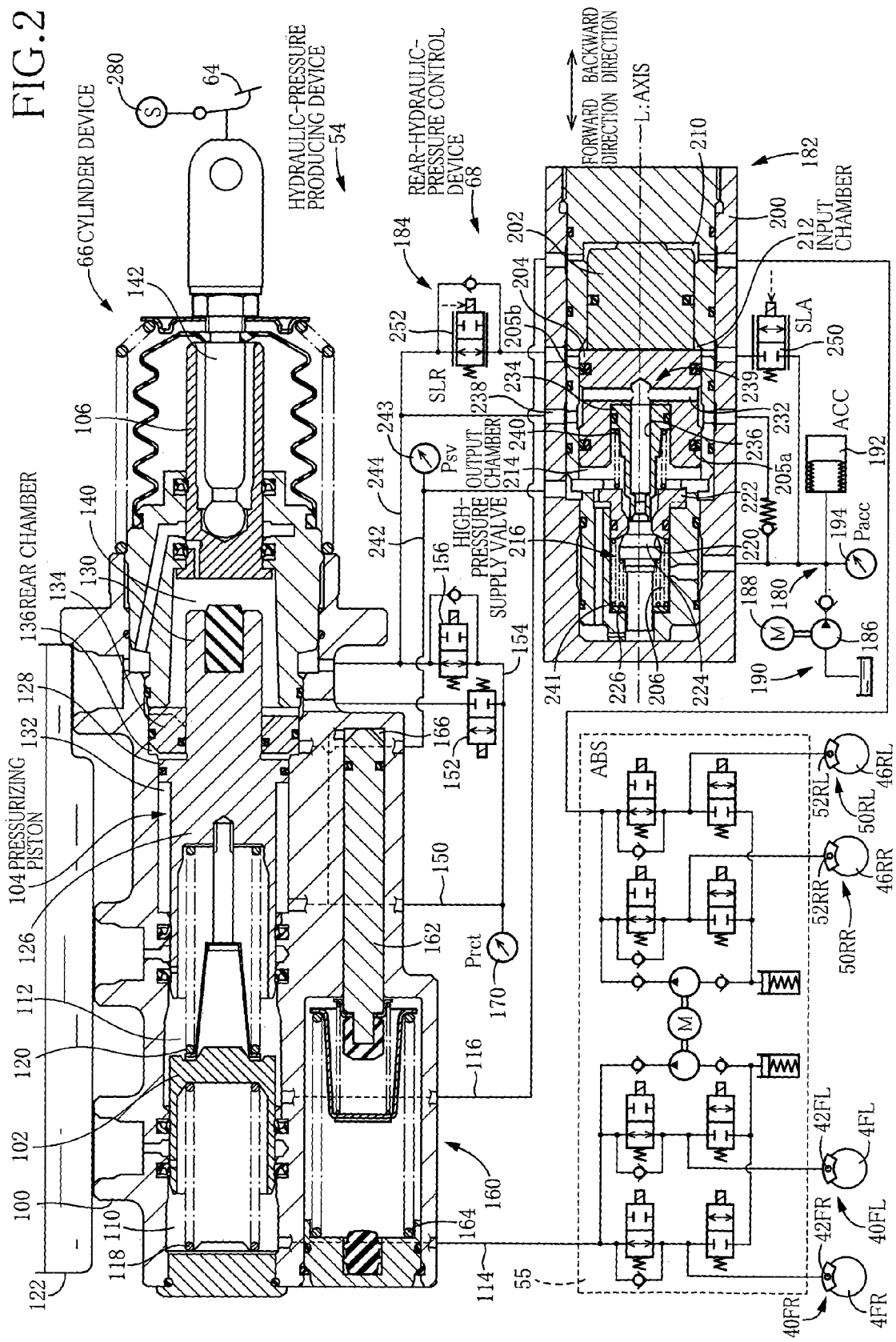
FIG. 2 is a brake-fluid circuit diagram of the hydraulic braking system.

As shown in FIG. 2, the hydraulic braking system includes (i) brake cylinders 42FL, FR of respective hydraulic brakes 40FL, FR provided for the respective front left and right wheels 4FL, FR and brake cylinders 52RL, RR of respective hydraulic brakes 50RL, RR provided for respective rear left and right wheels 46RL, RR, (ii) a hydraulic-pressure producing device 54 capable of supplying hydraulic pressure to these brake cylinders 42FL, FR, 52RL, RR, and (iii) a slip control device 55 provided between the hydraulic-pressure producing device 54 and these brake cylinders 42FL, FR, 52RL, RR. The hydraulic-pressure producing device 54 is controlled by a brake ECU 56 (see FIG. 1) constituted mainly by a computer.

Also the vehicle is equipped with a hybrid ECU 58. The hybrid ECU 58, the brake ECU 56, the engine ECU 18, the motor ECU 28, and the power-source monitoring unit 34 are communicable with one another to transmit and receive information as needed.

It is noted that the present hydraulic braking system is installable on not only the hybrid vehicles but also electric cars and fuel-cell vehicles, for example. The electric cars are not equipped with the internal-combustion drive device 8. In the fuel-cell vehicles, the drive motor is driven by a fuel cell stack, for example.

The present hydraulic braking system is also installable on internal combustion vehicles. The internal combustion vehicles are not equipped with the electric drive device 6. In such vehicles, the regenerative braking force is not applied to the drive wheels 4FL, FR, so that a regenerative cooperative control is not executed.

<Structure of Hydraulic Braking System>

In the hydraulic braking system shown in FIG. 2, the hydraulic-pressure producing device 54 includes (i) a brake pedal 64 as a brake operating member, (ii) a cylinder device 66, and (iii) a rear-hydraulic-pressure control device 68 configured to control hydraulic pressure in a rear chamber 136 of the cylinder device 66.

[Cylinder Device]

The cylinder device 66 includes (a) a housing 100 and (b) pressurizing pistons 102, 104 and an input piston 106 that are arranged in a line and fluid-tightly and slidably fitted in a cylinder bore formed in the housing 100.

Pressure chambers 110, 112 are defined in front of the respective pressurizing pistons 102, 104. The brake cylinders 42FL, FR of the hydraulic brakes 40FL, FR for the respective front left and right wheels 4FL, FR are hydraulically coupled to the pressure chamber 110 via a liquid passage 114, while the brake cylinders 52RL, RR of the hydraulic brakes 50RL, RR for the respective rear left and right wheels 46RL, RR are hydraulically coupled to the pressure chamber 112 via a liquid passage 116. These hydraulic brakes 40FL, FR, 50RL, RR are activated by the hydraulic pressure in the brake cylinders 42FL, FR, 52RL, RR to restrain rotations of the respective wheels 4FL, FR, 46RL, RR.

A return spring 118 is disposed between the pressurizing piston 102 and the housing 100, and a return spring 120 is disposed between the two pressurizing pistons 102, 104. These springs 118, 120 respectively urge the pressurizing pistons 102, 104 in their backward direction. When the pressurizing pistons 102, 104 are located at their respective back end positions, the pressure chambers 110, 112 communicate with a reservoir 122.

The pressurizing piston 104 includes (a) a front piston portion 126 provided at a front portion of the pressurizing piston 104, (b) an intermediate large-diameter portion 128 (may be also referred to as "intermediate piston portion") provided at an intermediate portion of the pressurizing piston 104 and projecting in a radial direction of the pressurizing piston 104, and (c) a rear small-diameter portion 130 having a diameter smaller than that of the intermediate large-diameter portion 128 and provided at a rear portion of the pressurizing piston 104. The front piston portion 126 and the intermediate large-diameter portion 128 are fluid-tightly and slidably fitted in the housing 100. The pressure chamber 112 is defined in front of the front piston portion 126, and an annular chamber 132 is defined in front of the intermediate large-diameter portion 128.

An annular inner protruding portion 134 is provided on an inner face of the housing 100. The pressurizing piston 104 is fluid-tightly and slidably fitted in this inner protruding portion 134 at a rear of the intermediate large-diameter portion 128, that is, the rear small-diameter portion 130 is fluid-tightly and slidably fitted in the inner protruding portion 134. This design forms the rear chamber 136 between the intermediate large-diameter portion 128 and the inner protruding portion 134 at a rear of the intermediate large-diameter portion 128.

The input piston 106 is disposed at a rear of the pressurizing piston 104 (specifically, the rear small-diameter portion 130), and a transmission chamber 140 is defined between the input piston 106 and the rear small-diameter portion 130. The input piston 106 is linked at its rear portion with the brake pedal 64 by using an operating rod 142 and other components. The transmission chamber 140 communicates with the reservoir 122 when the input piston 106 is located at its back end position.

The annular chamber 132 and the transmission chamber 140 are hydraulically coupled to each other via a liquid passage 150 on which is provided a normally-closed solenoid valve, namely a lock valve 152. A portion of the liquid passage 150 which is nearer to the annular chamber 132 than to the lock valve 152 is hydraulically coupled to the reservoir 122 via a reservoir passage 154. Provided on the reservoir passage 154 is a normally-open solenoid valve, namely an open valve 156.

A stroke simulator 160 is connected to the liquid passage 150. The stroke simulator 160 includes (a) a simulator piston 162 fitted in the housing so as to be movable relatively to each other, (b) a spring 164 provided between the housing and the simulator piston 162, and (c) a simulator chamber 166 provided on an opposite side of the simulator piston 162 from the spring 164. The annular chamber 132 and the transmission chamber 140 are hydraulically coupled to the simulator chamber 166 via the liquid passage 150. The stroke simulator 160 is operated by hydraulic pressure in the annular chamber 132 and the transmission chamber 140.

A hydraulic sensor 170 is provided on the liquid passage 150 at a position nearer to the annular chamber 132 than a connection between the liquid passage 150 and the reservoir passage 154. While the hydraulic sensor 170 detects the hydraulic pressure in the transmission chamber 140 (which is equal to the hydraulic pressure in the annular chamber 132) when the lock valve 152 is open, the hydraulic pressure in the transmission chamber 140 is determined to have a magnitude related to an operating force of the brake pedal 64. In this sense, the hydraulic sensor 170 may be referred to as "operating-force sensor". Also, since the hydraulic pressure in the transmission chamber 140 applies a reaction force to the brake pedal 64, the hydraulic sensor 170 may also be referred to as "reaction force sensor".

[Rear-Hydraulic-Pressure Control Device]

The rear-hydraulic-pressure control device 68 is hydraulically coupled to the rear chamber 136.

The rear-hydraulic-pressure control device 68 includes (a) a high pressure source 180, (b) a regulator 182, and (c) an input-hydraulic-pressure control valve device 184.

The high pressure source 180 includes: a pump device 190 with a pump 186 and a pump motor 188; and an accumulator 192 for receiving working fluid or brake fluid discharged from the pump 186 and accumulating it in a pressurized state. Hydraulic pressure of the brake fluid accumulated in the accumulator 192 is called an accumulator pressure that is detected by an accumulator pressure sensor 194. The pump motor 188 is controlled such that this accumulator pressure is kept within a predetermined range.

The regulator 182 includes (d) a housing 200 and (e) a pilot piston 202 and a control piston 204 provided in the housing 200 so as to be arranged in a line in a direction parallel to the axis L.

The housing 200 has a stepped cylinder bore formed therein, and this cylinder bore has a large diameter portion and a small diameter portion. The pilot piston 202 is fluid-tightly and slidably fitted in the large diameter portion, and the control piston 204 is also fitted in the large diameter portion fluid-tightly and slidably by sealing portions 205a, b. Defined in the small diameter portion is a high pressure chamber 206 hydraulically coupled to the high pressure source 180. It is noted that the housing 200 may be constituted by a single component or a plurality of components.

A pilot pressure chamber 210 is defined between the pilot piston 202 and the housing 200, an input chamber 212 is defined between the pilot piston 202 and the control piston 204, and a servo pressure chamber 214 as one example of an output chamber is defined between the control piston 204 and a step of the cylinder bore formed between the large diameter portion and the small diameter portion. A high-pressure supply valve 216 is provided between the servo pressure chamber 214 and the high pressure chamber 206.

The housing 200 contains a seat member 222 including a seat 220. The high-pressure supply valve 216 includes (f) this seat 220, (g) a body 224 movable so as to be seated against or spaced apart from the seat 220, and (h) a spring 226 provided between the body 224 and the housing 200 to urge the body 224 in a direction in which the body 224 is to be seated against the seat 220 (i.e., in its backward direction).

Formed in a central portion of a main body of the control piston 204 are a fitting bore extending parallel to the axis L and a liquid passage 232 having a portion extending in a direction perpendicular to the axis L (i.e., in a radial direction of the control piston 204) so as to communicate with the fitting bore. The liquid passage 232 is provided at a position where the liquid passage 232 communicates with a low pressure port 238 formed in the housing 200. A valve opening member 234 extending parallel to the axis L is fitted in the fitting bore. A central portion of the valve opening member 234 has a through hole 236 extending parallel to the axis L. One end portion of the through hole 236 is open to the liquid passage 232 while the other end portion of the through hole 236 faces the body 224. As a result, the end portion of the valve opening member 234 which faces the body 224 and the low pressure port 238 are hydraulically coupled to each other via the through hole 236 and the liquid passage 232, so that the through hole 236 and the liquid passage 232 constitute a low-pressure-port communication passage 239.

A spring 240 is provided between the valve opening member 234 and the seat member 222, and this spring 240 urges the control piston 204 (including the valve opening member 234) in the backward direction.

As thus described, the control piston 204 has a generally stepped shape, and the input chamber 212 is defined at a rear of a large diameter portion of the control piston 204 while the servo pressure chamber 214 is defined in front of a step formed between the large diameter portion and a small diameter portion of the control piston 204. Thus, the control piston 204 can act as a pressurization piston for raising hydraulic pressure in the servo pressure chamber 214 with respect to hydraulic pressure in the input chamber 212.

It is noted that a spring 241 is provided between the seat member 222 and the housing 200 to position the seat member 222 relative to the housing 200.

The liquid passage 116 is connected to the pilot pressure chamber 210. Thus, hydraulic pressure in the pressure chamber 112 of the cylinder device 66 acts on the pilot piston 202.

The rear chamber 136 of the cylinder device 66 is connected to the servo pressure chamber 214 via a servo passage 242. The hydraulic pressure in the servo pressure chamber 214, called servo hydraulic pressure, is supplied to the rear chamber 136 to activate the cylinder device 66. A servo-hydraulic-pressure sensor 243 is provided on the servo passage 242 to detect the servo hydraulic pressure. As shown in FIG. 2, the servo pressure chamber 214 and the rear chamber 136 are directly connected to each other, and accordingly the hydraulic pressure in the servo pressure chamber 214 is normally equal in magnitude to the hydraulic pressure in the rear chamber 136.

The reservoir 122 is hydraulically coupled to the low pressure port 238 via a reservoir passage 244.

Connected to the input chamber 212 is the input-hydraulic-pressure control valve device 184 including a pressurization linear control valve (SLA) 250 and a pressure-reduction linear control valve (SLR) 252. The pressurization linear control valve 250 is provided between the input chamber 212 and the high pressure source 180, and the pressure-reduction linear control valve 252 is provided between the input chamber 212 and the reservoir 122.

As shown in FIG. 3(a-1), the pressurization linear control valve 250 includes: (A) a seating valve member including (1) a seat 260, (2) a body 262, and (3) a spring 264 applying an urging force Fs in a direction in which the body 262 is to be seated against the seat 260; and (B) a solenoid including (4) a coil 266 and (5) a plunger 268 holding the body 262.

The pressurization linear control valve 250 is a normally-closed solenoid control valve that is in its closed state when no current is delivered to the coil 266. A pressure differential force Fp related to a pressure differential between hydraulic pressure in the high pressure source 180 and the hydraulic pressure in the input chamber 212 (i.e., a high-low pressure differential that is a pressure differential between the high pressure side and the low pressure side) acts on the pressurization linear control valve 250 in a direction in which the body 262 is moved away from the seat 260. When a current is supplied to the coil 266, an electromagnetic motive force Fd acts on the plunger 268 in the direction in which the body 262 is moved away from the seat 260.

As thus described, the pressure differential force Fp, the urging force Fs of the spring 264, and the electromagnetic motive force Fd act on the pressurization linear control valve 250, and a relationship among these forces is represented as Equation (11).

$$Fd+Fp=Fs \qquad (11)$$

Equation (11) shows that, assuming that the urging force Fs of the spring 264 is generally constant, the body 262 can be moved off the seat 260 even if the electromagnetic motive force Fd is small in the case where the pressure differential force Fp is large. Thus, it can be seen that as shown in FIG. 3(a-2) a valve opening current IopenA is smaller in the case where the high-low pressure differential in the pressurization linear control valve 250 is large than in the case where the high-low pressure differential in the pressurization linear control valve 250 is small. Also, Equation (11) shows that (i) in the case where the pressure differential force Fp is constant (that is, the high-low pressure differential is constant), a larger electromagnetic motive force Fd increases the urging force Fs of the spring 264, which increases a distance between the body 262 and the seat 260, i.e., a degree of opening. (ii) A flow rate at which the brake fluid flows through the pressurization linear control valve 250 is determined based on a value (AP·PD) obtained by multiplying an opening degree AP by a high-low pressure differential PD. Thus, the flow rate is higher in the case where the high-low pressure differential PD is large as indicated by solid lines in FIG. 3(a-3) than in the case where the high-low pressure differential PD is small as indicated by broken lines in FIG. 3(a-3). (iii) As described above, the valve opening current IopenA is smaller in the case where the high-low pressure differential is large than in the case where the high-low pressure differential is small. (iv) In the case where an upper limit value is set in the electromagnetic motive force Fd, an upper limit value of the degree of opening is smaller in the case where the differential pressure force Fp is small than in the case where the differential pressure force Fp is large. (v) A sliding resistance is caused between the plunger 268 and a housing of the pressurization linear control valve 250, which produces hysteresis.

In view of the above (i)-(v), a relationship represented in FIG. 3(a-3) is established between the supply current and the flow rate.

As shown in FIG. 3(b-1), the pressure-reduction linear control valve 252 includes: (A) a seating valve member including (1) a seat 270, (2) a body 272, and (3) a spring 274 applying an urging force Fs in a direction in which the body 272 is moved away from the seat 270; and (B) a solenoid including (4) a coil 276 and (5) a plunger 278 holding the body 272. The pressure-reduction linear control valve 252 is a normally-open solenoid control valve that is in its open state when no current is delivered to the coil 276. A pressure differential force Fp related to a high-low pressure differential (that is obtained by subtracting hydraulic pressure in the reservoir 122 (i.e., atmospheric pressure) from the hydraulic pressure in the input chamber 212 and that is equal to the hydraulic pressure in the input chamber 212) acts on the pressure-reduction linear control valve 252 in the direction in which the body 272 is moved away from the seat 270. When current is supplied to the coil 276, an electromagnetic motive force Fd acts on the plunger 278 in a direction in which the body 272 is to be seated against the seat 270.

As thus described, the pressure differential force Fp, the urging force Fs of the spring 274, and the electromagnetic motive force Fd act in the pressure-reduction linear control valve 252, and a relationship among these forces is represented as Equation (12).

$$Fp+Fs=Fd \qquad (12)$$

Equation (12) shows that, assuming that the urging force Fs of the spring 274 is constant, as shown in FIG. 3(b-2) a valve opening current IopenR is larger in the case where the high-low pressure differential is large than in the case where the high-low pressure differential is small. The pressure-reduction linear control valve 252 is in the open state when a supply current value therefor is smaller than the valve opening current IopenR. It is noted that as indicated by a broken line in FIG. 3(b-2) when current greater than the valve opening current IopenR by a set value AIs, the pressure-reduction linear control valve 252 can be kept in the closed state at the pressure differential.

Equation (12) also shows that (i) in the case where the high-low pressure differential is constant, a larger electromagnetic motive force increases the urging force of the spring 274, which reduces the degree of opening. (ii) A smaller pressure differential reduces the valve opening current IopenR. (iii) A flow rate at which the brake fluid flows through the pressure-reduction linear control valve 252 is higher in the case where the value (AP·PD) obtained by multiplying the opening degree AP by the high-low pressure differential PD is large than in the case where the value (AP·PD) is small as described above.

In view of the above, a relationship represented in FIG. 3(b-3) is established between the supply current and the flow rate.

Sensors connected to the brake ECU 56 include the operating-force sensor 170, the accumulator pressure sensor 194, the servo-hydraulic-pressure sensor 243, and a stroke sensor 280 for detecting an operating stroke (i.e., actuation travel) of the brake pedal 64. Also, components connected to the brake ECU 56 include the slip control device 55, the lock valve 152, the open valve 156, and the input-hydraulic-pressure control valve device 184 (including the pressurization linear control valve 250 and the pressure-reduction linear control valve 252). A storage portion of the brake ECU 56 stores various tables and programs, for example.

<Operation of Hydraulic Braking System>

When the hydraulic braking system is under normal conditions, and the regenerative cooperative control is executed, an open state of the lock valve 152 and a closed state of the open valve 156 are established. This provides communication between the transmission chamber 140 and the annular chamber 132 and communication between the transmission chamber 140 and the simulator chamber 166 and disconnects or isolates the transmission chamber 140 and the annular chamber 132 from the reservoir 122.

When the brake pedal 64 is depressed, the input piston 106 is advanced or moved forward relative to the pressurizing piston 104 to disconnect the transmission chamber 140 from the reservoir 122, causing the brake fluid to flow to the simulator chamber 166, which activates the stroke simulator 160.

The annular chamber 132 and the transmission chamber 140 communicate with each other. Thus, hydraulic pressures in these chambers are equal to each other. Also, the area of a pressure receiving surface of the intermediate piston portion 128 which faces the annular chamber 132 is equal to the area of a pressure receiving surface of the rear small-diameter portion 130 which faces the transmission chamber 140. Therefore, a forward force (i.e., a force in a forward direction) acting on the rear small-diameter portion 130 and a backward force (i.e., a force in the backward direction) acting on the intermediate piston portion 128 are balanced with each other in the pressurizing piston 104, thereby inhibiting the pressurizing piston 104 from being advanced by the operating force applied to the brake pedal 64. The input piston 106 is advanced relative to the pressurizing piston 104. Also, since the pressurizing piston 104 is located at its back end position, the front pressure chambers 110, 112 are in communication with the reservoir 122.

As thus described, for a duration in time that the regenerative braking force is enough for a total requested braking force requested by a driver, no hydraulic pressure is produced in the pressure chambers 110, 112, so that the regulator 182 is in a non-operating state, and the hydraulic pressure in the rear chamber 136 is the atmospheric pressure.

On the other hand, when the regenerative braking force is not enough for (i.e., less than) the total requested braking force, the hydraulic pressure is supplied to the rear chamber 136. The supplied hydraulic pressure advances the pressurizing pistons 104, 102, so that the hydraulic pressure is produced in the front pressure chambers 110, 112 and supplied to the brake cylinders 52, 42. Since the hydraulic pressure in the transmission chamber 140 is equal to the hydraulic pressure in the annular chamber 132 as described above, a forward force related to the hydraulic pressure in the rear chamber 136 is applied to the pressurizing piston 104, whereby hydraulic pressure related to the hydraulic pressure in the rear chamber 136 is produced in the pressure chambers 110, 112.

Based on information sent from the hybrid ECU 58, the brake ECU 56 determines target values of the hydraulic pressure in the brake cylinders 42, 52 such that the sum of the regenerative braking force and a hydraulic braking force related to the hydraulic pressure in the brake cylinders 42, 52 is enough for the total requested braking force. Based on these determined target values, the brake ECU 56 determines a target value of the hydraulic pressure in the rear chamber 136. Since the hydraulic pressure in the rear chamber 136 and the hydraulic pressure in the servo pressure chamber 214 are equal to each other in magnitude as described above, the target value of the hydraulic pressure in the rear chamber 136 is equal to a target value of the hydraulic pressure in the servo pressure chamber 214, namely target servo hydraulic pressure Psvref. The total requested braking force is determined based on a driver's request, for example, the total requested braking force is determined based on at least one of the operating force detected by the operating-force sensor 170 and the stroke detected by the stroke sensor 280.

The hydraulic pressure in the rear chamber 136 is controlled by the rear-hydraulic-pressure control device 68.

There will be next explained operations of the regulator 182 with reference to FIGS. 4(a)-4(h). FIGS. 4(a)-4(h) schematically and simply illustrate the construction of the regulator 182 for the clarity of its operations.

[Operations and Characteristics of Regulator]

Figure 4:
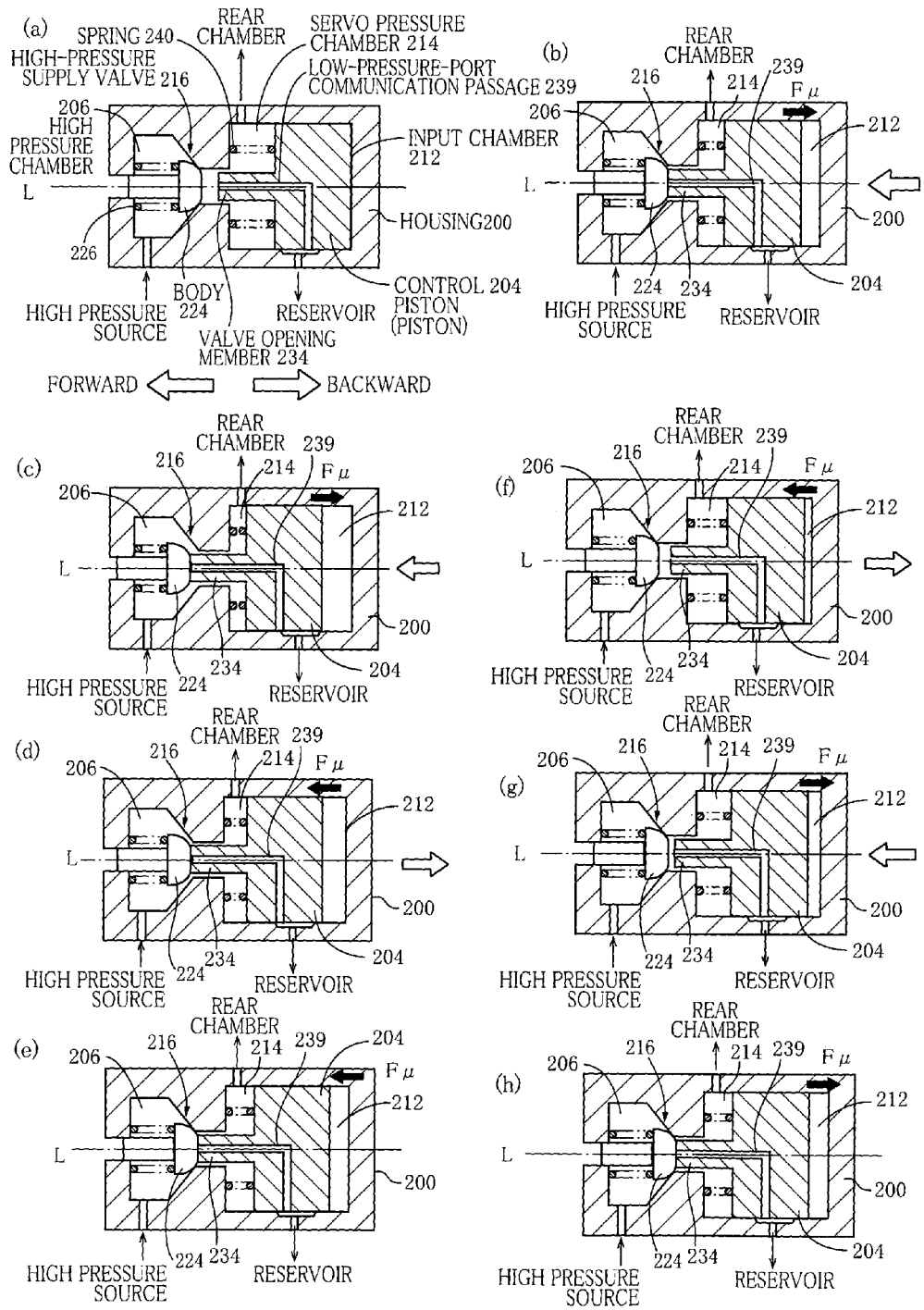
FIGS. 4($a$)-($h$) are views for explaining operations of a regulator of the hydraulic-pressure control device.

When the regulator 182 is in the non-operating state, as shown in FIG. 4(a) the control piston 204 is located in its back end position. The valve opening member 234 is located at some distance from the body 224, so that the high-pressure supply valve 216 is in the closed state. The servo pressure chamber 214 communicates with the reservoir 122 via the low-pressure-port communication passage 239 and the reservoir passage 244, so that a servo hydraulic pressure Psv is approximately equal to the atmospheric pressure, i.e., the hydraulic pressure in the reservoir 122.

The control piston 204 is advanced when an increase in an input hydraulic pressure Pin causes a forward force applied to the control piston 204 to become larger than the sum of an urging force Fsv of the spring 240 and a frictional force between the control piston 204 and the housing 200. As shown in FIG. 4(b), the valve opening member 234 is brought into contact with the body 224, which disconnects the servo pressure chamber 214 from the reservoir 122. The position of the control piston 204 at which the high-pressure supply valve 216 is in the closed state, and the servo pressure chamber 214 is isolated from the reservoir 122 and the high pressure chamber 206 may be referred to as "holding position".

Forces acting on the control piston 204 are: the urging force Fsv of the spring 240; a force (Pin·Ain) obtained by multiplying the input hydraulic pressure Pin as the hydraulic pressure in the input chamber 212 by an area Ain of a pressure receiving surface of the control piston 204 which faces the input chamber 212; and a force (Psv·Asv) obtained by multiplying the servo hydraulic pressure (i.e., the output hydraulic pressure) Psv as an actual hydraulic pressure in the servo pressure chamber 214 by an area Asv of a pressure receiving surface of the control piston 204 which faces the servo pressure chamber 214. Since the spring 240 has a small spring constant, the urging force Fsv can be regarded as approximately constant (i.e., a force corresponding to the set load). In view of the above, when the control piston 204 is located at the holding position, Equation (13) is provided in most cases (specifically, in a case where no consideration is given to the sliding resistance).

$$Psv \cdot Asv = Pin \cdot Ain - Fsv \tag{13}$$

The area Asv of the pressure receiving surface of the control piston 204 which faces the servo pressure chamber 214 is smaller than the area Ain of the pressure receiving surface of the control piston 204 which faces the input chamber 212. Thus, the servo hydraulic pressure Psv is larger than the input hydraulic pressure Pin, whereby the regulator 182 has a function as a pressurization device.

When an increase in the input hydraulic pressure Pin causes the forward force applied to the control piston 204 to become larger than a force required for opening the high-pressure supply valve 216 (noted that the force includes an urging force of the spring 226), the control piston 204 is advanced, so that the body 224 is moved off the seat 220 by the valve opening member 234 as shown in FIG. 4(c), thereby changing the high-pressure supply valve 216 to the open state. Communication between the servo pressure chamber 214 and the high pressure chamber 206 is established to build up or raise the servo hydraulic pressure Psv. A region within which the control piston 204 can be located with the high-pressure supply valve 216 being in the open state is a pressure-buildup region, and a position of the control piston 204 within the pressure-buildup region will be referred to as "pressure-buildup position". In a case where the control piston 204 is being advanced at the pressure-buildup position (i.e., within the pressure-buildup region), Equation (14) is provided.

$$Psv \cdot Asv = Pin \cdot Ain - Fsv - Fsh - F\mu \tag{14}$$

$F\mu$ denotes a sliding resistance caused between the control piston 204 and the housing 200, and this sliding resistance is mainly caused due to the sealing portions 205a, b. Fsh denotes the urging force of the spring 226.

On the other hand, when the servo hydraulic pressure Psv is raised with respect to the input hydraulic pressure Pin, as shown in FIG. 4(d) a direction of a force applied to the control piston 204 is switched from the forward direction to the backward direction (that is, a direction of the sliding resistance $F\mu$ is reversed), so that the control piston 204 is moved backward.

In a case where the control piston 204 is being moved backward at the pressure-buildup position (i.e., within the pressure-buildup region), Equation (15) is provided.

$$Psv \cdot Asv = Pin \cdot Ain - Fsv - Fsh + F\mu \tag{15}$$

When the control piston 204 is moved backward to the holding position, as shown in FIG. 4(e) the body 224 is seated against the seat 220, so that the high-pressure supply valve 216 is changed to the closed state. The servo pressure chamber 214 is isolated from the high pressure chamber 206 and the reservoir 122.

Figure 5:
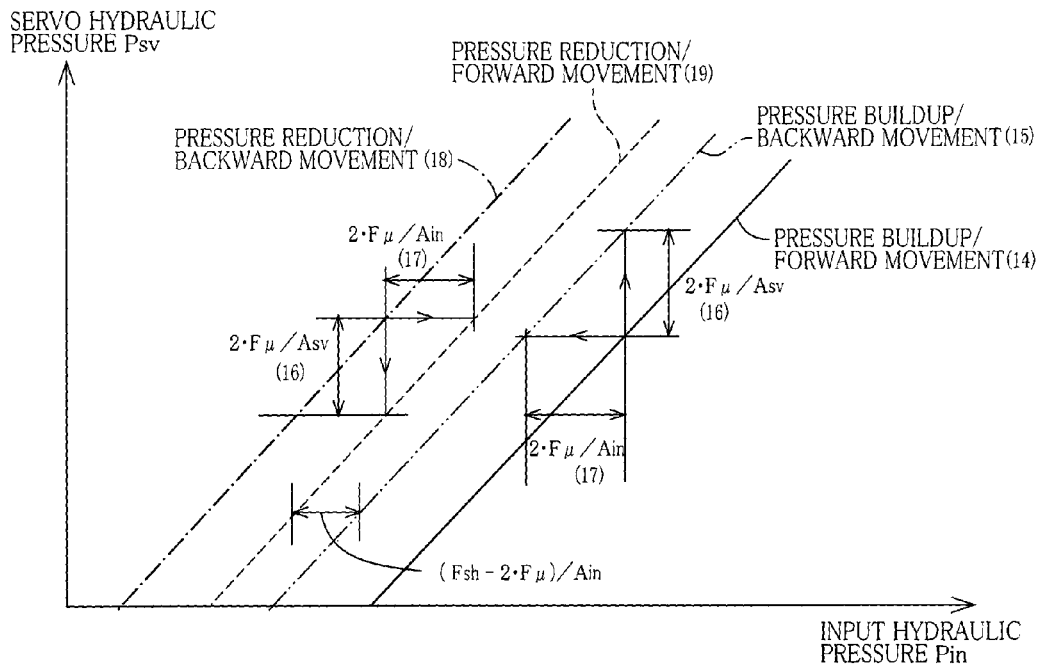
FIG. 5 is a view representing a relationship between an input hydraulic pressure and a servo hydraulic pressure in the regulator.

Since the sliding resistance $F\mu$ is thus caused between the control piston 204 and the housing 200, hysteresis is exhibited as shown in FIG. 5.

A solid line in FIG. 5 indicates a relationship between the input hydraulic pressure Pin and the servo hydraulic pressure Psv in the case where the control piston 204 is being advanced at the pressure-buildup position, and this relationship provides Equation (14). A two-dot chain line indicates a relationship between the input hydraulic pressure Pin and the servo hydraulic pressure Psv in the case where the control piston 204 is moved backward at the pressure-buildup position, and this relationship provides Equation (15).

In a case where the hydraulic pressure in the servo pressure chamber 214 is built up and maintained, the control piston 204 is reciprocated in a direction along the axis L, specifically, the control piston 204 is advanced to the pressure-buildup position and then moved backward to the holding position. When a control mode is switched from a pressure buildup mode to a pressure holding mode in which the input hydraulic pressure Pin is maintained, a state in which Equation (14) is established is switched to a state in which Equation (15) is established. During this switch, the hydraulic pressure in the servo pressure chamber 214 is raised by a changing amount $\Delta Psv$ represented by Equation (16).

$$\Delta Psv = 2F\mu/Asv \tag{16}$$

At a point in time when the control mode is switched from the pressure buildup mode to the pressure holding mode, the servo pressure chamber 214 and the high pressure chamber 206 are in communication with each other. Thus, the hydraulic pressure in the servo pressure chamber 214 is built up by the changing amount $\Delta Psv$ by the time when the control piston 204 is moved backward to the holding position.

In other words, the control mode is switched from the pressure buildup mode to the pressure holding mode to hold or maintain the input hydraulic pressure Pin, the hydraulic pressure in the servo pressure chamber 214 needs to be raised by the changing amount $\Delta Psv$ to switch the direction of the force applied to the control piston 204, from the forward direction to the backward direction.

Also, to switch the state in which Equation (14) is established to the state in which Equation (15) is established with the servo hydraulic pressure Psv being constant, that is, to move the control piston 204 backward to the holding position with the servo hydraulic pressure Psv being constant, the input hydraulic pressure Pin needs to be reduced by a changing amount $\Delta Pin$ represented by Equation (17).

$$\Delta Pin = 2F\mu/Ain \tag{17}$$

It is noted that when the control mode is switched from the pressure buildup mode to the pressure holding mode and the input hydraulic pressure Pin is maintained, the input chamber 212 is disconnected from the high pressure source 180 and the reservoir 122. In this case, the backward movement of the control piston 204 is allowed by elastic deformation of the housing 200.

As described above, the sliding resistance $F\mu$ is caused due to the sealing portions 205a, b provided between the control piston 204 and the housing 200. In the present embodiment, each of the sealing portions 205a, b has a double structure in which a rubber O ring and a resin annular member are respectively fitted on an inside part and an outside part of the sealing portion. Thus, a magnitude of the sliding resistance $F\mu$ is determined mainly by a property (e.g., a material) of the resin forming the annular member fitted in the outside part.

In the present embodiment, the magnitude of the sliding resistance $F\mu$ is obtained in advance as a fixed value (i.e., a constant value). The sliding resistance $F\mu$ may be obtained by experiments or the like. Alternatively, a value determined by the material of the sealing portions 205a, b may be used as the sliding resistance $F\mu$.

When the input hydraulic pressure Pin is reduced and the control piston 204 is moved backward from the holding position, as shown in FIG. 4(f) the servo pressure chamber 214 is disconnected from the high pressure chamber 206 and communicates with the reservoir 122, so that the servo hydraulic pressure Psv is reduced. A region within which the control piston 204 can be located with the servo pressure chamber 214 being in communication with the reservoir 122 is a pressure-reduction region, and a position of the control piston 204 within the pressure-reduction region is a pressure-reduction position. In a case where the control piston 204 is being moved backward within the pressure-reduction region, Equation (18) is provided.

$$Psv \cdot Asv = Pin \cdot Ain - Fsv + F\mu \quad (18)$$

Also, when the servo hydraulic pressure Psv is lowered with respect to the input hydraulic pressure Pin, as shown in FIG. 4(g) the direction of the force applied to the control piston 204 is switched from the backward direction to the forward direction (that is, the direction of the sliding resistance $F\mu$ is reversed), which advances the control piston 204. In a case where the control piston 204 is advanced within the pressure-reduction region, Equation (19) is provided.

$$Psv \cdot Asv = Pin \cdot Ain - Fsv - F\mu \quad (19)$$

When the input chamber 212 is isolated from the high pressure source 180 and the reservoir 122, the forward movement of the control piston 204 is allowed by the elastic deformation of the housing 200.

When the valve opening member 234 is brought into contact with the body 224 by the forward movement of the control piston 204, as shown in FIG. 4(h) the servo pressure chamber 214 is disconnected from the reservoir 122, and the hydraulic pressure in the servo pressure chamber 214 is maintained.

As described above, the valve opening member 234 is spaced apart from the body 224 when the control piston 204 is located within the pressure-reduction region. Thus, as indicated by Equations (18), (19), a force corresponding to the force required for opening the high-pressure supply valve 216 does not act on the control piston 204.

A one-dot chain line in FIG. 5 indicates a relationship between the input hydraulic pressure Pin and a servo hydraulic pressure Pout in the case where the control piston 204 is being moved backward at the pressure-reduction position, and this relationship provides Equation (18). A broken line in FIG. 5 indicates a relationship between the input hydraulic pressure Pin and the servo hydraulic pressure Pout in the case where the control piston 204 is being advanced at the pressure-reduction position, and this relationship provides Equation (19).

When the control mode is switched from the pressure reduction mode to the pressure holding mode in which the input hydraulic pressure Pin is maintained, that is, when the state in which Equation (18) is established is switched to the state in which Equation (19) is established, the servo hydraulic pressure Psv is lowered by the changing amount $\Delta Psv$ represented by Equation (16). That is, for a duration in time that the control piston 204 is advanced from its back position to the holding position, the servo pressure chamber 214 and the reservoir 122 are in communication with each other, so that the hydraulic pressure in the servo pressure chamber 214 is lowered.

Also, where the servo hydraulic pressure Psv is kept constant, the input hydraulic pressure Pin needs to be raised by the changing amount $\Delta Pin$ represented by Equation (17).

In this way, an absolute value of a difference (subtractive value or difference value) that is a value obtained by subtracting the actual servo hydraulic pressure Psv from the target servo hydraulic pressure Psvref is reduced due to operating characteristics of the regulator 182, whereby the pressure holding mode is established, and even when the input hydraulic pressure Pin is maintained, the servo hydraulic pressure Psv is thereafter changed by the changing amount $\Delta Psv$ (=$2F\mu/Asv$). This makes it difficult to control the servo hydraulic pressure Psv accurately, making it difficult to accurately bring the hydraulic pressure in the rear chamber 136 closer to a target value Pref.

In order to solve this problem, in the present embodiment, a buildup-holding (pressurization-holding) transition mode is established following the pressure buildup mode in the control of the input hydraulic pressure Pin instead of direct switch from the pressure buildup mode (i.e., a pressurization control) to the pressure holding mode (i.e., a holding control). In the buildup-holding transition mode, the input hydraulic pressure Pin is controlled such that the control piston 204 is moved backward toward the holding position. Also, the control mode is switched to the pressure reduction mode (i.e., a pressure-reduction control), the reduction-holding transition mode, and the pressure holding mode in order, and in the reduction-holding transition mode, the input hydraulic pressure Pin is controlled such that the control piston 204 is advanced toward the holding position.

[Control for Input Hydraulic Pressure]

The input hydraulic pressure Pin is controlled by the pressurization linear control valve 250 and the pressure-reduction linear control valve 252 to bring the servo hydraulic pressure Psv closer to the target servo hydraulic pressure Psvref and accordingly to bring the hydraulic pressure in the rear chamber 136 closer to the target value. While feedback control is executed for the pressurization linear control valve 250 and the pressure-reduction linear control valve 252, the predetermined relationship is established between the servo hydraulic pressure Psv and the input hydraulic pressure Pin as described above, and therefore it is possible to consider that a servo-hydraulic-pressure difference that is a difference between a target hydraulic pressure Psvref and an actual hydraulic pressure Psv in the servo pressure chamber 214 is equal to an input-hydraulic-pressure difference that is a difference between a target hydraulic pressure Prefin and an actual hydraulic pressure Pin in the input chamber 212. In the following explanation in the present embodiment, the servo-hydraulic-pressure difference is regarded as the input-hydraulic-pressure difference to consider that the pressurization linear control valve 250 and the pressure-reduction linear control valve 252 are controlled based on these differences, and the servo-hydraulic-pressure difference will be simply referred to as "difference".

As the relationship between the servo hydraulic pressure Psv and the input hydraulic pressure Pin, any of the relationships in Equations (14), (15), (18), (19) may be selectively used for each of the pressurization control, the pressure-reduction control, the forward movement of the control piston 204, and the backward movement thereof. Also, the relationship in Equation (13) may be simply used as the relationship between the servo hydraulic pressure Psv and the input hydraulic pressure Pin.

Figure 6:
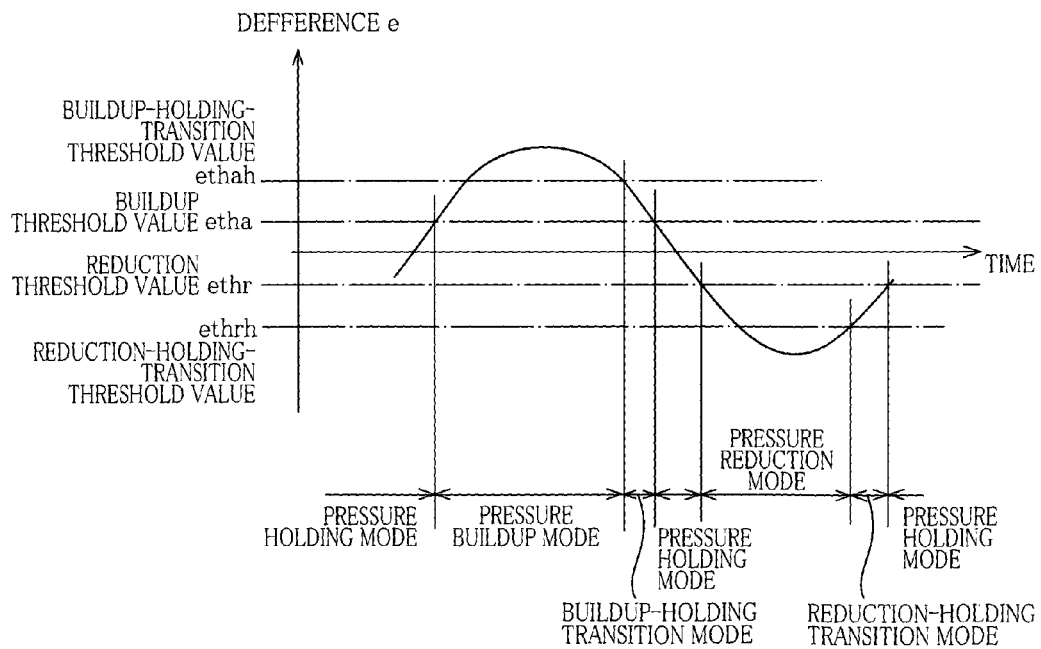
FIG. 6 is a map representing a control-mode determination table stored in a storage portion of a brake ECU of the hydraulic-pressure control device.

As shown in FIG. 6, while the pressure buildup mode is established when a difference e is greater than a buildup (pressurization) threshold value etha, the buildup-holding transition mode is established when the difference is not on an increasing trend (i.e., on the increase) (that is, the difference is on a decreasing trend (i.e., on the decrease) or a holding trend) and is less than a buildup-holding-transition threshold value ethah as a pressurization-side set value. In other words, the pressure buildup mode is established (1) when the difference e is equal to or greater than the buildup-holding-transition threshold value ethah or (2) when the difference e is less than the buildup-holding-transition threshold value ethah and greater than the buildup threshold value etha and is on the increase, while the buildup-holding transition mode is established when the difference e is less than the buildup-holding-transition threshold value ethah and greater than the buildup threshold value etha and is not on the increase.

In the pressure buildup mode, the closed state of the pressure-reduction linear control valve 252 is established, and the supply current for the coil 266 of the pressurization linear control valve 250 is controlled to execute the pressurization control for the hydraulic pressure in the input chamber 212.

A value of the supply current for the coil 266 of the pressurization linear control valve 250, namely a supply current value IA, is determined as a value obtained by adding a feedback current amount IFB to the valve opening current IopenA.

$$IA = IopenA + IFB \quad (20)$$

The feedback current amount IFB may be, for example, a value (IFB=e·KA) obtained by multiplying the difference e (i.e., the target hydraulic pressure—the actual hydraulic pressure) by a feedback coefficient KA.

A value of the supply current for the coil 276 of the pressure-reduction linear control valve 252, namely a supply current value IR, is determined as a current amount that is, as indicated by the broken line in FIG. 3(*b*-2), larger than the valve opening current IopenR by the set value ΔIs.

$$IR = IopenR + \Delta Is \quad (21)$$

The supply current value IR for the pressure-reduction linear control valve 252 is thus determined to have a magnitude indicated by the broken line in FIG. 3(*b*-2). Thus, the pressure-reduction linear control valve 252 can be reliably kept in the closed state in the pressurization control.

It is not essential that the supply current value IR for the coil 276 of the pressure-reduction linear control valve 252 is determined according to Equation (21) as long as the pressure-reduction linear control valve 252 is kept in the closed state in the pressurization control for the input hydraulic pressure Pin. For example, a current having a maximum value IRmax may be supplied to the pressure-reduction linear control valve 252. However, in the case where the supply current value IR is determined according to Equation (21), less power consumption is needed than in the case where the current having the maximum value IRmax is supplied to the pressure-reduction linear control valve 252.

It is noted that supply current values for the pressurization linear control valve 250 and the pressure-reduction linear control valve 252 in each control mode are shown in FIG. 8 in list form.

In the buildup-holding transition mode, the supply current value IR for the coil 276 of the pressure-reduction linear control valve 252 is determined according to Equation (21), and the supply current value IA for the coil 266 of the pressurization linear control valve 250 is determined according to Equation (22).

$$IA = IopenA + IFB - \Delta Isa \quad (22)$$

As shown in Equation (22), the supply current value IA for the pressurization linear control valve 250 in the buildup-holding transition mode is less than that in the pressure buildup mode by a set value ΔIsa. The set value ΔIsa may be a fixed value or a variable value.

The buildup-holding-transition threshold value ethah can be determined as, for example, the changing amount ΔPsv (=2Fμ/Asv) represented by Equation (16). When the input hydraulic pressure Pin is maintained in a case where the target servo hydraulic pressure Psvref is constant, the servo hydraulic pressure Psv can be brought closer to the target servo hydraulic pressure Psvref.

In the case where the difference e is on the increase, even when the difference is less than the buildup-holding-transition threshold value ethah, the buildup-holding transition mode is not established, and the pressure buildup mode is kept. This is because the servo hydraulic pressure Psv is preferably brought closer to the target servo hydraulic pressure Psvref actively when the difference e is on the increase and thereby the servo hydraulic pressure Psv is brought further from the target servo hydraulic pressure Psvref. This operation can reduce an amount of, lowering of a response.

When the supply current value for the pressurization linear control valve 250 is determined in the present embodiment, as shown in FIG. 3(*a*-3) the hysteresis in the pressurization linear control valve 250 is taken into consideration.

That is, when the trend of the supply current value determined according to Equation (20) is changed from the increasing trend to the decreasing trend, the supply current value is reduced by an amount equal to or greater than a width of the hysteresis. This allows a direction of the movement of the plunger 268 to be speedily reversed to speedily change a trend of the flow rate from the increasing trend to the decreasing trend.

In the buildup-holding transition mode, the supply current value IA for the coil 266 of the pressurization linear control valve 250 is reduced, so that a flow rate of the brake fluid into the input chamber 212 is also reduced, resulting in reduction in an increase gradient of the input hydraulic pressure Pin. However, delay in control does not cause immediate reduction in the increase gradient of the servo hydraulic pressure Psv. Accordingly, the servo hydraulic pressure Psv becomes high relative to the input hydraulic pressure Pin, whereby the direction of the force applied to the control piston 204 is switched from the forward direction to the backward direction. As a result, the control piston 204 is moved backward toward the holding position.

It is noted that the backward movement of the control piston 204 is allowed mainly by the elastic deformation of the housing 200.

When the difference e becomes less than the buildup threshold value etha, the pressure holding mode is established. In the pressure holding mode, the closed states of the pressurization linear control valve 250 and the pressure-reduction linear control valve 252 are established, and the supply current value IA for the pressurization linear control valve 250 is set at a value less than the valve opening current IopenA by the set value ΔIs.

$$IA = IopenA - \Delta Is \quad (23)$$

The supply current value for the pressurization linear control valve 250 in the pressure holding mode can be set at zero, but in a case where a current greater than zero and less than the valve opening current IopenA as shown in Equation (23) is supplied to the pressurization linear control valve 250, this valve 250 can be reliably kept in the closed state, and when the pressure buildup mode is established following this holding mode, it is possible to suppress delay in activation of the pressurization linear control valve 250.

The supply current value IR for the pressure-reduction linear control valve 252 is determined according to Equation (21).

While the pressure reduction mode is established when the difference e is less than a pressure-reduction threshold value ethr, the reduction-holding transition mode is established when the absolute value of the difference e is not on the increasing trend (that is, the value is on the decreasing trend or the holding trend) and is greater than a reduction-holding-transition threshold value ethrh as a reduction-side set value. In other words, the pressure reduction mode is established (1) when the difference e is equal to or less than the reduction-holding-transition threshold value ethrh, or (2) when the difference e is greater than the reduction-holding-transition threshold value ethrh and less than the pressure-reduction threshold value ethr, and the absolute value of the difference e is on the increase, while the reduction-holding transition mode is established when the difference e is greater than the reduction-holding-transition threshold value ethrh, and the absolute value of the difference e is not on the increase.

In the pressure reduction mode, the supply current value IA for the pressurization linear control valve 250 is set at a value determined according to Equation (23) (IA=IoepnA−ΔIs), the supply current value IR for the coil 276 of the pressure-reduction linear control valve 252 is determined, for example, as a value obtained by subtracting a feedback current IFB from the valve opening current IopenR. The feedback current IFB can be determined as a value obtained by multiplying an absolute value |e| of the difference by a feedback coefficient KR.

IR=IopenR−IFB

IFB=KR·|e|    (24)

In the reduction-holding transition mode, the closed state of the pressurization linear control valve 250 is established, and the supply current value IR for the pressure-reduction linear control valve 252 is determined as a value greater by a set value ΔIsr than the current amount obtained according to Equation (24).

IR=IopenR−IFB+ΔIsr    (25)

When a trend of the supply current value for the pressure-reduction linear control valve 252 is changed from the decreasing trend to the increasing trend, the supply current value is preferably increased by an amount equal to or greater than a width of hysteresis determined according to a table in FIG. 3(*b*-3).

In the reduction-holding transition mode, the supply current value IR for the pressure-reduction linear control valve 252 is determined as a relatively large value. A flow rate of the brake fluid from the input chamber 212 is reduced, resulting in reduction in a reduction gradient. However, delay in control does not cause immediate reduction in the reduction gradient of the servo hydraulic pressure Psv. Accordingly, the input hydraulic pressure Pin becomes high relative to the servo hydraulic pressure Psv, whereby the direction of the force applied to the control piston 204 is switched from the backward direction to the forward direction. As a result, the control piston 204 is advanced toward the holding position.

Figure 7:
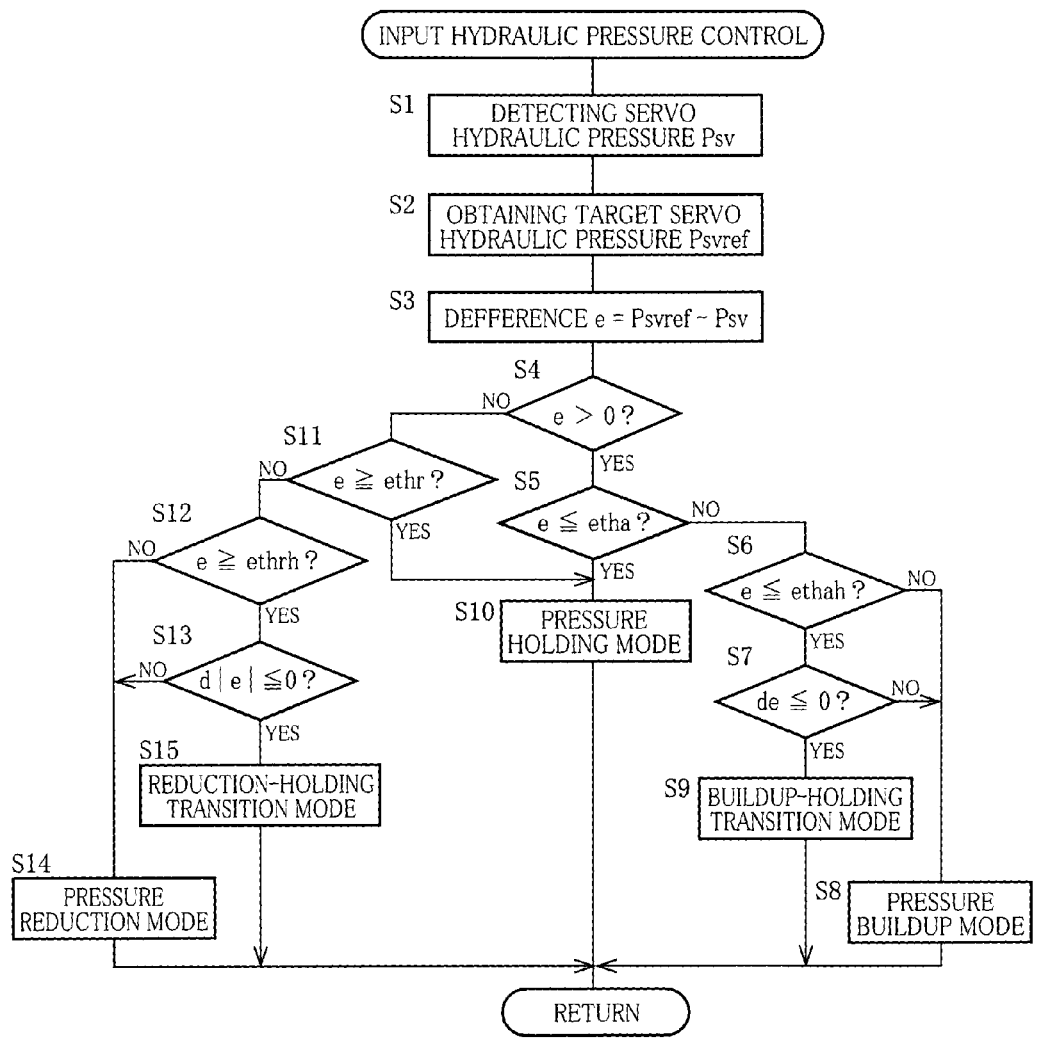
FIG. 7 is a flow chart representing an input-hydraulic-pressure control program stored in the storage portion.

An input-hydraulic-pressure control program indicated by the flow chart in FIG. 7 is executed every predetermined set time.

At step 1 ("step" is omitted where appropriate), the actual servo hydraulic pressure Psv is detected by the servo-hydraulic-pressure sensor 243. The target servo hydraulic pressure Psvref is obtained at S2, and the difference e is obtained at S3.

When the regenerative cooperative control is executed, the target value of the hydraulic braking force is determined such that the regenerative braking force and the hydraulic braking force satisfy the total requested braking force requested by the driver. Based on this determined target value, a target value of the hydraulic pressure in the brake cylinder is determined, which in turn determines the target value of the hydraulic pressure in the rear chamber 136 that is equal to the target value of the hydraulic pressure in the servo pressure chamber 214, i.e., the target servo hydraulic pressure Psvref.

In the case where the regenerative cooperative control is not executed or in the case of the internal combustion vehicles, the target value of the hydraulic braking force is determined as the total requested braking force, based on which the target hydraulic pressure in the brake cylinders 42, 52 is determined, and in turn the target servo hydraulic pressure Psvref is determined.

At S4, it is determined whether the difference e is a positive value or not. That is, it is determined whether the actual servo hydraulic pressure Psv is insufficient for the target servo hydraulic pressure Psvref or not. When the actual servo hydraulic pressure Psv is insufficient for the target servo hydraulic pressure Psvref, it is determined at S5 whether or not the difference e is equal to or less than the buildup threshold value etha. At S6, it is determined whether or not the difference e is equal to or less than the buildup-holding-transition threshold value ethah. At S7, it is determined whether or not the difference e is on the decreasing trend or the holding trend (i.e., not on the increasing trend).

(i) When the difference e is greater than the buildup-holding-transition threshold value ethah (S6: NO) or (ii) when the difference e is greater than the buildup threshold value etha and equal to or less than the buildup-holding-transition threshold value ethah, and the difference e is not on the increase (S7: NO), the pressure buildup mode is established at S8.

When the pressurization control brings the actual servo hydraulic pressure Psv closer to the target servo hydraulic pressure Psvref and thereby the difference e becomes equal to or less than the buildup-holding-transition threshold value ethah and when the difference e is on the decreasing trend or the holding trend (that is, when the actual servo hydraulic pressure Psv is not brought further from the target servo hydraulic pressure Psvref), a positive decision is made at S8, and the buildup-holding transition mode is established at S9.

On the other hand, when the difference e is equal to or less than the buildup threshold value etha, a positive decision is made at S5, and the pressure holding mode is established at S10.

When the difference e is equal to or less than zero, that is, when the actual servo hydraulic pressure Psv is high with respect to the target servo hydraulic pressure Psvref, it is determined at S11 whether or not the difference e is equal to or greater than the pressure-reduction threshold value ethr, and it is determined at S12 whether or not the difference e is equal to or greater than the reduction-holding-transition threshold value ethrh, and it is determined at S13 whetehr or not the absolute value of the difference e is on the decreasing trend or the holding trend.

(i) When the difference e is less than the reduction-holding-transition threshold value ethrh (S12: NO) or when (ii) the difference e is equal to or greater than the reduction-holding-transition threshold value ethrh and less than the pressure-reduction threshold value ethr, and when the absolute value of the difference e is on the increase (S13: NO), the pressure reduction mode is established at S14. When the difference e is equal to or greater than the reduction-holding-transition threshold value ethrh and the actual servo hydraulic pressure Psv is not brought further from the target servo hydraulic pressure Psvref, a positive decision is made at S13, and the reduction-holding transition mode is established at S15. When the difference e is equal to or greater than the pressure-reduction threshold value ethr, the pressure holding mode is established at S10.

Figure 9:
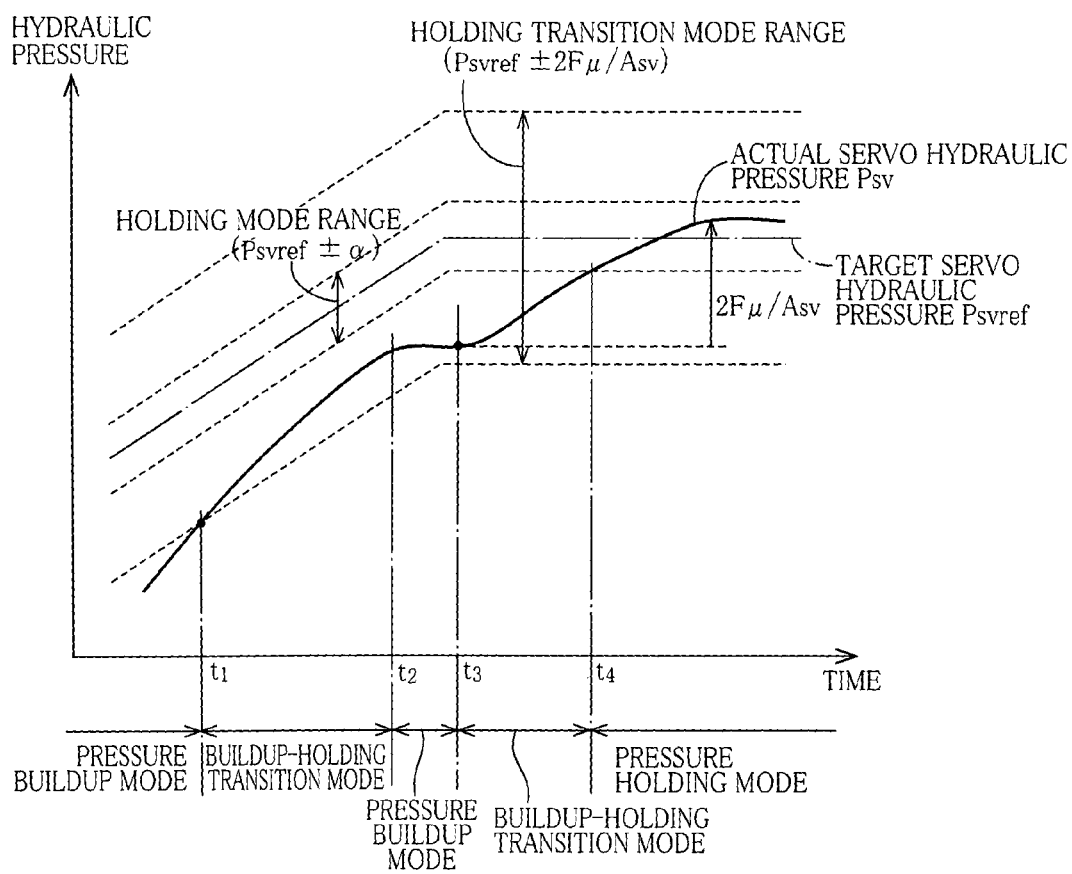
FIG. 9 is a view representing one example of execution of the input-hydraulic-pressure control program (i.e., change in the servo hydraulic pressure)

There will be next explained a specific example of the control with reference to FIG. 9.

First, the pressure buildup mode is established and thereby the actual servo hydraulic pressure Psv is brought closer to the target servo hydraulic pressure Psvref. At time t1, when the difference e becomes less than the buildup-holding-transition threshold value ethah (with the difference e being not on the increase), the buildup-holding transition mode is established. The control piston 204 is moved backward, and the increase gradient of the actual servo hydraulic pressure Psv is suppressed.

However, when an increase in the target servo hydraulic pressure Psvref at time t2 causes the difference e to be on the increase (that is, when the actual servo hydraulic pressure Psv is brought further from the target servo hydraulic pressure Psvref), the pressure buildup mode is established even when the difference e is less than the buildup-holding-transition threshold value ethah. The pressure buildup mode is established and thereby the actual servo hydraulic pressure Psv is brought closer to the target servo hydraulic pressure Psvref, and when the difference e ceases being on the increasing trend at time t3, the buildup-holding transition mode is established again. When the difference e becomes less than the buildup threshold value etha at time t4, the pressure holding mode is established. The servo hydraulic pressure Psv is built up by the changing amount ΔPsv (=2Fµ/Asv) upon the establishment of the buildup-holding transition mode at time t3, whereby the servo hydraulic pressure Psv is satisfactorily brought closer to the target servo hydraulic pressure Psvref.

As thus explained, in the case where there is a high possibility that the control mode is switched to the pressure holding mode in the pressure buildup mode, the buildup-holding transition mode is established in which the control piston 204 is moved backward and then the pressure holding mode is established. As a result, it is possible to reduce an amount of the increase in the servo hydraulic pressure Psv after the pressure holding mode is established, whereby the servo hydraulic pressure Psv can be satisfactorily brought closer to the target servo hydraulic pressure Psvref.

Even where the regulator 182 having a relatively large sliding resistance Fµ is used, the control accuracy for the servo hydraulic pressure Psv can be improved, making it possible to satisfactorily bring the hydraulic pressure in the rear chamber 136 closer to the target value Pref. This can improve control accuracy for the hydraulic pressure in the brake cylinders 42, 52, thereby improving control accuracy for the hydraulic braking force.

In the event of a malfunction in the hydraulic braking system, the closed state of the lock valve 152 and the open state of the open valve 156 are established. That is, the transmission chamber 140 is disconnected from the annular chamber 132 and the reservoir 122 and closed. Also, the communication between the annular chamber 132 and the reservoir 122 is established. This inhibits the volume of the transmission chamber 140 from varying, whereby the pressurizing pistons 104, 102 are advanced with the advance of the input piston 106.

Also, in the regulator 182, the hydraulic pressure in the pressure chamber 112 is supplied to the pilot pressure chamber 210 to advance the pilot piston 202 and the control piston 204, which disconnects the servo pressure chamber 214 from the reservoir 122, resulting in the increase in the servo hydraulic pressure Psv. This hydraulic pressure in the servo pressure chamber 214 is supplied to the rear chamber 136, whereby an assisting force related to the operating force is applied to the pressurizing pistons 104, 102, which raises the hydraulic pressure in the pressure chambers 110, 112.

In the present embodiment, as thus described, the brake fluid at high pressure is supplied to the rear chamber 136 even in the event of the malfunction in the hydraulic braking system. Thus, the hydraulic pressure in the pressure chambers 110, 112 can be raised accordingly, whereby the hydraulic pressure in the brake cylinders 42FL, FR, 52RL, RR can be raised.

In view of the above, in the present embodiment, the rear-hydraulic-pressure control device 68 and portions of the brake ECU 56 which store and execute the input-hydraulic-pressure control program in FIG. 7 constitute a hydraulic-pressure control device, for example.

The input-hydraulic-pressure control valve device 184 and portions of the brake ECU 56 which store and execute the input-hydraulic-pressure control program in FIG. 7 constitute an input-hydraulic-pressure control device, for example. Portions of the input-hydraulic-pressure control device which store and execute the processings at S9, S15 constitute a moving-direction control unit and a sliding-resistance-related pressure control unit, for example. The moving-direction control unit can be considered to include a non-increasing-trend control unit (i.e., non-increasing-trend-period control unit), a change-gradient suppressing unit, a sliding-resistance switching unit, and an acting-force control unit.

The pressurization linear control valve 250 is one example of a pressurization control valve, and the pressure-reduction linear control valve 252 is one example of a pressure-reduction control valve. The pressurization linear control valve 250 and units which store and execute the processings at S8, S9 constitute a pressurization control unit, for example. Portions of the pressurization control unit which store and execute the processing at S8 constitute a pressurization current-value determination unit, for example. Portions of the pressurization control unit which store and execute the processing at S9 constitute a pressurization-holding-transition current-value determination unit, for example. Also, the pressure-reduction linear control valve 252 and portions of the pressurization control valve 252 which store and execute the processings at S14, S15 constitute a pressure-reduction control unit, for example. Portions of the pressure-reduction control unit which store and execute the processing at S14 constitute a reduction current-value determination unit, for example. Portions of the pressure-reduction control unit which store and execute the processing at S15 constitute a reduction-holding-transition current-value determination unit, for example. Units which store and execute the processings at S8, S10, S14 constitute a normal control unit, for example. Units which store and execute the processings at S9, S15 constitute a hysteresis-related-current-value determination unit, for example. The pressurization linear control valve 250 and the pressure-reduction linear control valve 252 are examples of an electromagnetic control valve. The operating-force sensor 170, the stroke sensor 280, and portions of the brake ECU 56 which strore and execute the processing at S2 in FIG. 7 constitutes a target output-hydraulic-pressure determination unit.

Embodiment 2

While the sliding resistance Fµ is a fixed value in the above-described embodiment, some materials or properties of the sealing portions 205a, b cause great change in a contact area due to change in a surface pressure, resulting in great change in the sliding resistance Fμ. When the servo hydraulic pressure Psv (or the input hydraulic pressure Pin) is raised, the annular member fitted in the outside part of the sealing portion is elastically deformed, and the rubber O ring fitted on the inside part is elastically deformed, which raises a surface pressure between the housing 200 and the annular member fitted in the outside part, whereby the sliding resistance Fμ is raised.

Figure 10:
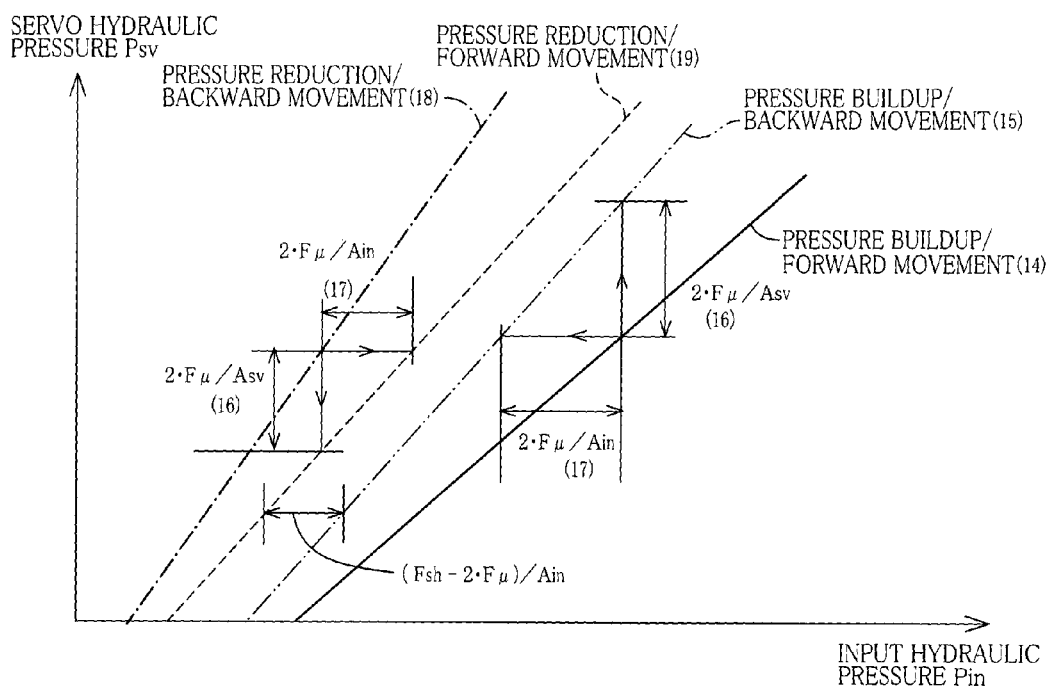
FIG. 10 is a view representing a relationship between a input hydraulic pressure and a servo hydraulic pressure in a regulator of a hydraulic braking system according to an embodiment 2 of the present invention.

Thus, the sliding resistance Fμ may be a variable value that is larger in the case where the servo hydraulic pressure Psv (or the input hydraulic pressure Pin) is high than in the case where the servo hydraulic pressure Psv (or the input hydraulic pressure Pin) is low. In Equations (14), (15) and Equations (18), (19), the sliding resistance Fu increases with the increase in the servo hydraulic pressure Psv. Thus, a distance between the solid line and the two-dot chain line and a relationship between the one-dot chain line and the broken line are those represented in FIG. 10. As shown in FIG. 10, a width of the hysteresis is greater in the case where the input hydraulic pressure Pin is high than in the case where the input hydraulic pressure Pin is low.

Figure 11:
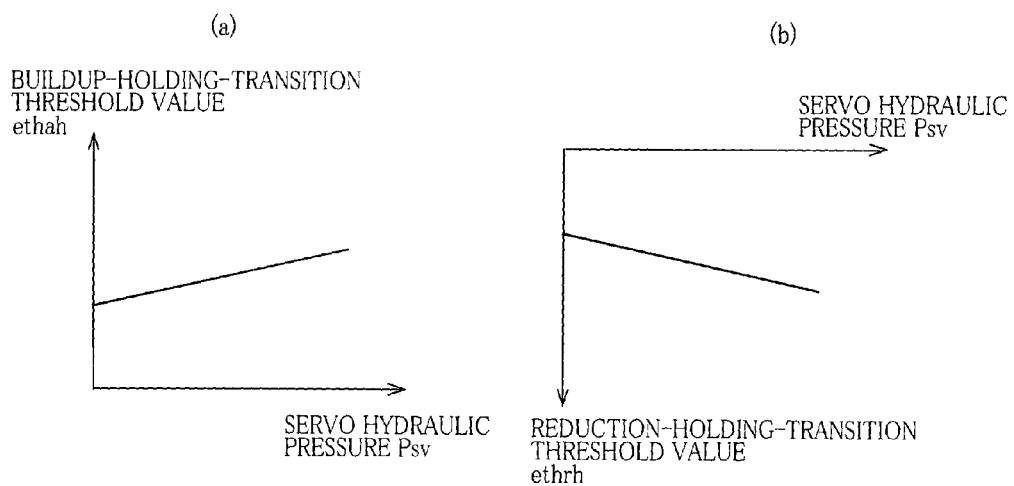
FIG. 11($a$) is a view representing a buildup-holding-transition threshold-value determination table stored in the storage portion of the brake ECU of the hydraulic-pressure control device included in the hydraulic braking system, and FIG. 11($b$) is a view representing a reduction-holding-transition threshold-value determination table stored in the storage portion.

In the present embodiment, as shown in FIGS. 11(a), 11(b), the absolute value of each of the buildup-holding-transition threshold value ethah and the reduction-holding-transition threshold value ethrh is larger in the case where the servo hydraulic pressure Psv is high than in the case where the servo hydraulic pressure Psv is low. When the control mode is set according to the table in FIG. 6, the buildup-holding-transition threshold value ethah and the reduction-holding-transition threshold value ethrh are determined based on the servo hydraulic pressure Psv in each determination.

It is noted that consideration may not be given to the hysteresis in the control of the pressurization linear control valve 250 and the pressure-reduction linear control valve 252.

As shown in FIGS. 3(a-3), 3(b-3), hysteresis characteristics differ depending upon the high-low pressure differential in the pressurization linear control valve 250. Thus, the high-low pressure differential can be obtained to determine the hysteresis characteristics. The input hydraulic pressure Pin is estimated based on the actual servo hydraulic pressure Psv as the detection value of the servo-hydraulic-pressure sensor 243 and the equation(s) related thereto, and the high-low pressure differential can be obtained based on the estimated input hydraulic pressure Pin.

Also, the control of the supply current for the pressurization linear control valve 250 and the pressure-reduction linear control valve 252 is not limited to that in the above-described embodiment. For example, a feedforward control may be executed for the supply current.

Also, the absolute values of the buildup threshold value etha and the absolute value of the pressure-reduction threshold value ethr may or may not be equal to each other, and the absolute value of the buildup-holding-transition threshold value ethah and the absolute values of the reduction-holding-transition threshold value ethrh may or may not be equal to each other.

Also, when the difference e is a positive value and less than the buildup-holding-transition threshold value ethah and when the difference e is a negative value and greater than the reduction-holding-transition threshold value ethrh, the buildup-holding transition mode and the reduction-holding transition mode can be respectively established regardless of whether the absolute value of the difference e is on the increase or not.

Also, the regenerative cooperative control is not essential. The present invention is applicable to a hydraulic braking system in which the hydraulic pressure is controlled so as to satisfy the total requested braking force. When the regenerative cooperative control is not executed, operation feelings of the driver are determined by the characteristics of the stroke simulator 160, and the hydraulic pressure in the rear chamber 136 is controlled such that a hydraulic braking force corresponding to the hydraulic pressure in the brake cylinders 42, 52 satisfies the total requested braking force.

Also, the target value in the rear chamber 136 may be determined in any manner and may be determined at a value based on a running state of the vehicle, for example. It is noted that the target value may be determined with consideration of pilot pressure acting on the pilot piston 202.

The cylinder device 66 may have any structure as long as the rear chamber is provided at a rear of the pressurizing piston. For example, the stroke simulator 160 may be provided separately from the cylinder device 66.

The regulator 182 may have any structure. For example, the pilot piston may not be provided. Also, the hydraulic pressure in the transmission chamber 140 may act on the pilot pressure chamber 210 of the regulator 182.

A device to be controlled is not limited to the brake cylinder. Any component or device may be a device to be controlled.

It is to be understood that the invention is not limited to the details of the illustrated embodiments, but may be embodied with various changes and modifications, which may occur to those skilled in the art, without departing from the spirit and scope of the invention.

The invention claimed is:

1. A hydraulic-pressure control device comprising:
a regulator comprising: a housing; a control piston fluid-tightly and slidably fitted in the housing; an input chamber provided at a rear of the control piston; and an output chamber provided in front of the control piston; and
an input-hydraulic-pressure control device configured to control hydraulic pressure in the input chamber to move the control piston forward to raise hydraulic pressure in the output chamber and configured to control the hydraulic pressure in the input chamber to move the control piston backward to reduce the hydraulic pressure in the output chamber,
wherein the input-hydraulic-pressure control device comprises a moving-direction control unit configured to:
when a difference that is a value obtained by subtracting an actual hydraulic pressure in the output chamber from a target hydraulic pressure in the output chamber is less than a pressurization-side set value, control the hydraulic pressure in the input chamber to move the control piston backward; and
when the difference is greater than a reduction-side set value, control the hydraulic pressure in the input chamber to move the control piston forward, wherein
the input-hydraulic-pressure control device comprises a normal control unit configured to:
raise the hydraulic pressure in the input chamber when the difference is greater than a pressurization threshold value;
reduce the hydraulic pressure in the input chamber when the difference is less than a pressure-reduction threshold value; and hold the hydraulic pressure in the input chamber when the difference is between the pressurization threshold value and the pressure-reduction threshold value, and wherein the pressurization-side set value is a value greater than the pressurization threshold value, and the reduction-side set value is a value less than the pressure-reduction threshold value.

2. The hydraulic-pressure control device according to claim 1, wherein each of at least one of the pressurization-side set value and the reduction-side set value is a value that is determined based on hydraulic pressure corresponding to a sliding resistance caused between the control piston and the housing.

3. The hydraulic-pressure control device according to claim 1, wherein each of at least one of the pressurization-side set value and the reduction-side set value is a value that is proportional to hydraulic pressure corresponding to twice a sliding resistance caused between the control piston and the housing.

4. The hydraulic-pressure control device according to claim 1, wherein an absolute value of each of at least one of the pressurization-side set value and the reduction-side set value is determined at a value that is greater in a case where at least one of the hydraulic pressure in the output chamber and the hydraulic pressure in the input chamber is high than in a case where the at least one of the hydraulic pressure in the output chamber and the hydraulic pressure in the input chamber is low.

5. The hydraulic-pressure control device according to claim 1, wherein the regulator further comprises: a high pressure chamber communicable with the output chamber and with a high pressure source; and a high-pressure supply valve provided between the high pressure chamber and the output chamber and configured to establish or interrupt the communication between the output chamber and the high pressure chamber, and wherein the control piston comprises a valve opening member configured to switch a state of the high-pressure supply valve from a closed state to an open state with the forward movement of the control piston.

6. The hydraulic-pressure control device according to claim 5, wherein the high-pressure supply valve comprises: a seat provided in the housing; a body provided that is movable to and away from the seat; and a spring configured to urge the body toward the seat, wherein the valve opening member is provided in an orientation in which the valve opening member extends in a direction of the movement of the control piston, and wherein the control piston further comprises a low-pressure-port communication passage that couples an end portion of the valve opening member which is contactable with the body of the high-pressure supply valve, to a low pressure port formed in the housing so as to communicate with a low pressure source.

7. The hydraulic-pressure control device according to claim 1, wherein the moving-direction control unit comprises a non-increasing-trend control unit configured to:

control the hydraulic pressure in the input chamber to move the control piston backward when the difference is less than the pressurization-side set value and is not on an increasing trend; and control the hydraulic pressure in the input chamber to move the control piston forward when the difference is greater than the reduction-side set value, and an absolute value of the difference is not on the increasing trend.

8. The hydraulic-pressure control device according to claim 1, wherein the moving-direction control unit comprises a change-gradient suppressing unit configured to:

when the difference is less than the pressurization-side set value, control the hydraulic pressure in the input chamber to reduce an increase gradient of the hydraulic pressure in the input chamber with respect to an increase gradient of the hydraulic pressure in the output chamber; and when the difference is greater than the reduction-side set value, control the hydraulic pressure in the input chamber to reduce a reduction gradient of the hydraulic pressure in the input chamber with respect to a reduction gradient of the hydraulic pressure in the output chamber.

9. The hydraulic-pressure control device according to claim 1, wherein the input-hydraulic-pressure control device comprises: a pressurization control unit configured to raise the hydraulic pressure in the input chamber to raise the hydraulic pressure in the output chamber; and a pressure-reduction control unit configured to reduce the hydraulic pressure in the input chamber to reduce the hydraulic pressure in the output chamber, wherein the pressurization control unit comprises: a pressurization linear control valve provided between the input chamber and a high pressure source and configured to allow working fluid to flow at a flow rate that is higher in a case where a supply current value for a solenoid of the pressurization linear control valve is large than in a case where the supply current value for the solenoid of the pressurization linear control valve is small; and a first current control unit configured to control a supply current for the pressurization linear control valve and comprising: a pressurization current-value determination unit configured, when the difference is equal to or greater than the pressurization-side set value, to determine the supply current value for the pressurization linear control valve based on the difference and a predetermined pressurization rule; and a pressurization-holding-transition current-value determination unit configured, when the difference is less than the pressurization-side set value, to determine the supply current value for the pressurization linear control valve as a value that is less than the supply current value determined based on the difference and the pressurization rule, and wherein the pressure-reduction control unit comprises: a pressure-reduction linear control valve provided between the input chamber and a low pressure source and configured to allow the working fluid to flow at a flow rate that is higher in a case where a supply current value for a solenoid of the pressure-reduction linear control valve is small than in a case where the supply current value for the solenoid of the pressure-reduction linear control valve is large; and a second current control unit configured to control a supply current for the pressure-reduction linear control valve and comprising a reduction current-value determination unit configured, when the difference is equal to or less than the reduction-side set value, to determine the supply current value for the pressure-reduction linear control valve based on the difference and a predetermined pressure-reduction rule; and a reduction-holding-transition current-value determination unit configured, when the difference is greater than the reduction-side set value, to determine the supply current value for the pressure-reduction linear control valve as a value that is greater than the supply current value determined based on the difference and the pressure-reduction rule.

10. The hydraulic-pressure control device according to claim 1, wherein the input-hydraulic-pressure control device comprises:
   at least one electromagnetic control valve coupled to the input chamber and each comprising a seat and a body, wherein a degree of opening between the seat and the body is determined as a value related to a supply current value for a solenoid of each of the at least one electromagnetic control valve; and
   a hysteresis-related-current-value determination unit configured, for each of the at least one electromagnetic control valve, to determine the supply current value therefor with consideration of hysteresis between the supply current value and the degree of opening.

11. The hydraulic-pressure control device according to claim 1, wherein the moving-direction control unit comprises a change-gradient suppressing unit configured to:
   make smaller an increase gradient of the hydraulic pressure in the input chamber with respect to the difference in a case where the difference is less than the pressurization-side set value than in a case where the difference is equal to or greater than the pressurization-side set value; and
   make smaller a reduction gradient of the hydraulic pressure in the input chamber with respect to the difference in a case where the difference is greater than the reduction-side set value than in a case where the difference is equal to or less than the reduction-side set value.

12. A hydraulic braking system comprising:
   the hydraulic-pressure control device according to claim 1;
   a cylinder device comprising: a housing; a pressurizing piston fluid-tightly and slidably fitted in the housing; a rear chamber provided at a rear of the pressurizing piston and coupled to the output chamber; and a front pressure chamber provided in front of the pressurizing piston; and
   a brake cylinder, coupled to the front pressure chamber, for a hydraulic brake to restrain rotation of a wheel of a vehicle.

13. The hydraulic braking system according to claim 12, wherein the hydraulic-pressure control device comprises a target output-hydraulic-pressure determination unit configured to determine the target hydraulic pressure in the output chamber based on target hydraulic pressure in the brake cylinder.

14. A hydraulic-pressure control device comprising:
   a regulator comprising: a housing; a control piston fluid-tightly and slidably fitted in the housing; an input chamber provided on one side of the control piston; and an output chamber provided on the other side of the control piston;
   an input-hydraulic-pressure control device configured to control hydraulic pressure in the input chamber to move the control piston to selectively raise or reduce hydraulic pressure in the output chamber;
   a cylinder device comprising: a housing; a pressurizing piston fluid-tightly and slidably fitted in the cylinder device housing; a rear chamber provided at a rear of the pressurizing piston and coupled to the output chamber; and a front pressure chamber provided in front of the pressurizing piston; and
   a brake cylinder, coupled to the front pressure chamber, for a hydraulic brake to restrain rotation of a wheel of a vehicle,
   wherein the input-hydraulic-pressure control device comprises:
   a sliding-resistance-related pressure control unit configured to control the hydraulic pressure in the input chamber with consideration of a sliding resistance caused between the control piston and the housing of the regulator; and
   a moving-direction control unit configured to:
      when a difference that is a value obtained by subtracting an actual hydraulic pressure in the output chamber from a target hydraulic pressure in the output chamber is less than a pressurization-side set value, control the hydraulic pressure in the input chamber to move the control piston backward; and
      when the difference is greater than a reduction-side set value, control the hydraulic pressure in the input chamber to move the control piston forward, wherein
   the input-hydraulic-pressure control device comprises a normal control unit configured to:
      raise the hydraulic pressure in the input chamber when the difference is greater than a pressurization threshold value;
      reduce the hydraulic pressure in the input chamber when the difference is less than a pressure-reduction threshold value; and
      hold the hydraulic pressure in the input chamber when the difference is between the pressurization threshold value and the pressure-reduction threshold value, and
   wherein the pressurization-side set value is a value greater than the pressurization threshold value, and the reduction-side set value is a value less than the pressure-reduction threshold value.

* * * * *